(12) United States Patent
Sikora et al.

(10) Patent No.: US 11,008,198 B2
(45) Date of Patent: May 18, 2021

(54) HOIST AND DEPLOYABLE EQUIPMENT APPARATUS, SYSTEM, AND METHOD

(71) Applicant: VITA INCLINATA TECHNOLOGIES, INC., Broomfield, CO (US)

(72) Inventors: Derek Sikora, Denver, CO (US); Logan Goodrich, Golden, CO (US); Daniel Stehling, Wheat Ridge, CO (US); Jonathan Zeller Oster, Denver, CO (US); Caleb B. Carr, Commerce City, CO (US); Patrick Carr, Gresham, OR (US)

(73) Assignee: VITA INCLINATA TECHNOLOGIES, INC, Broomfield, CO (US)

( * ) Notice: Subject to any disclaimer, the term of this patent is extended or adjusted under 35 U.S.C. 154(b) by 0 days.

(21) Appl. No.: 16/935,114

(22) Filed: Jul. 21, 2020

(65) Prior Publication Data

US 2021/0017000 A1 Jan. 21, 2021

Related U.S. Application Data

(60) Provisional application No. 62/876,721, filed on Jul. 21, 2019, provisional application No. 62/931,666, filed on Nov. 6, 2019.

(51) Int. Cl.
*B66C 13/00* (2006.01)
*B66C 13/06* (2006.01)

(52) U.S. Cl.
CPC .................... *B66C 13/06* (2013.01)

(58) Field of Classification Search
CPC . B66D 1/46; B66D 1/48; B66D 1/485; B66D 1/50; B66D 1/505; B66D 1/525;
(Continued)

(56) References Cited

U.S. PATENT DOCUMENTS

| | | | |
|---|---|---|---|
| 1,935,283 A | 11/1933 | Adams | |
| 2,651,533 A | 9/1953 | Miller | |

(Continued)

FOREIGN PATENT DOCUMENTS

GB 2513646 A 11/2014

OTHER PUBLICATIONS

International Search Report dated Apr. 3, 2019, for PCT/US19/13603, filed Jan. 15, 2019.
(Continued)

*Primary Examiner* — Emmanuel M Marcelo
(74) *Attorney, Agent, or Firm* — Adam L. K. Philipp; Martin Spencer Garthwaite; AEON Law

(57) ABSTRACT

Disclosed are systems, apparatuses, and methods to deploy and stow a deployable equipment to and from a hoist, to control a load on a suspension without transfer of torque to the suspension cable, for the deployable equipment to obtain data and information from the hoist, and for the deployable equipment to control the hoist, such as a reel of a hoist, to control a z-axis of a terminal end of the suspension cable. Control of the z-axis may be, for example, to control an elevation of a load, such as relative to carrier, ground, or an objective or target, to control a tension on or of suspension cable. Control of the z-axis may be, for example, to control a rate of ascent or descent of a terminal end of suspension cable.

16 Claims, 17 Drawing Sheets

(58) Field of Classification Search
CPC ... B66D 1/56; B66D 1/58; B66D 1/60; B64D 1/22; B64D 47/02; B66C 1/40
See application file for complete search history.

(56) References Cited

U.S. PATENT DOCUMENTS

| | | | |
|---|---|---|---|
| 2,717,656 | A | 9/1955 | Bannister |
| 3,036,797 | A | 5/1962 | Agusta |
| 3,044,818 | A | 7/1962 | Tobey |
| 3,265,336 | A | 8/1966 | Peterson |
| 3,554,468 | A | 1/1971 | McVicar |
| 3,598,440 | A | 8/1971 | Ramsden et al. |
| 3,601,342 | A | 8/1971 | Piasecki |
| 3,602,544 | A | 8/1971 | Marsh |
| 3,656,796 | A | 4/1972 | Cook |
| 3,690,602 | A | 9/1972 | Marsh |
| 3,829,052 | A | 8/1974 | Flannelly |
| 3,838,836 | A | 10/1974 | Asseo et al. |
| 3,904,156 | A | 9/1975 | Smith |
| 3,946,971 | A | 3/1976 | Chadwick |
| 4,124,181 | A | 11/1978 | Kolwey |
| 4,138,078 | A | 2/1979 | Hester et al. |
| 4,267,987 | A | 5/1981 | McDonnell |
| 4,364,704 | A | 12/1982 | Dreesen et al. |
| 4,378,919 | A | 4/1983 | Smith |
| 4,553,719 | A | 11/1985 | Ott |
| 4,601,444 | A | 7/1986 | Lindenbaum |
| 4,695,012 | A | 9/1987 | Lindenbaum |
| 4,747,745 | A | 5/1988 | Pippen et al. |
| 4,826,109 | A | 5/1989 | Camus |
| 4,881,601 | A | 11/1989 | Smith |
| 4,883,184 | A | 11/1989 | Albus |
| 4,889,297 | A | 12/1989 | Ikeda |
| 4,984,757 | A | 1/1991 | Hartung et al. |
| 5,143,326 | A | 9/1992 | Parks |
| 5,190,250 | A | 3/1993 | DeLong et al. |
| 5,249,652 | A | 10/1993 | Leitzman et al. |
| 5,273,333 | A | 12/1993 | Hatfield et al. |
| 5,344,203 | A | 9/1994 | Tollenaere |
| 5,352,056 | A | 10/1994 | Chandler |
| 5,443,566 | A | 8/1995 | Rushmer et al. |
| 5,451,032 | A | 9/1995 | Rhoads |
| 5,465,925 | A | 11/1995 | Connolly et al. |
| 5,499,785 | A | 3/1996 | Roberts et al. |
| 5,518,205 | A | 5/1996 | Wurst et al. |
| 5,562,394 | A | 10/1996 | Brown, Jr. |
| 5,593,113 | A * | 1/1997 | Cox .................. B64D 1/08 177/245 |
| 5,613,722 | A | 3/1997 | Fandrich et al. |
| 5,898,746 | A | 4/1999 | Bäversten et al. |
| 5,961,563 | A | 10/1999 | Overton |
| 6,189,834 | B1 * | 2/2001 | Dietz .................. B66C 1/34 244/137.1 |
| 6,199,793 | B1 | 3/2001 | Hainsworth et al. |
| 6,439,407 | B1 | 8/2002 | Jacoff et al. |
| 6,533,220 | B2 | 3/2003 | Schuster |
| 6,578,796 | B2 | 6/2003 | Maeda |
| 6,708,926 | B2 | 3/2004 | Bonisch |
| 6,983,833 | B2 | 1/2006 | Ivers et al. |
| 7,028,351 | B1 | 4/2006 | Frieder et al. |
| 7,267,240 | B2 | 9/2007 | Maurer et al. |
| 7,720,582 | B2 | 5/2010 | Makinadjian |
| 7,887,011 | B1 | 2/2011 | Baldwin |
| 7,948,237 | B2 | 5/2011 | Kuzmin et al. |
| 8,131,384 | B2 | 3/2012 | Karpman et al. |
| 8,157,205 | B2 | 4/2012 | McWhirk |
| 8,226,042 | B1 | 7/2012 | Howell et al. |
| 8,413,923 | B2 | 4/2013 | Brenner et al. |
| 8,534,607 | B2 | 9/2013 | Tardiff et al. |
| 8,534,608 | B1 | 9/2013 | Cox, IV |
| 8,840,355 | B1 | 9/2014 | Kulesha |
| 8,886,402 | B1 | 11/2014 | Lou |
| 8,888,048 | B2 | 11/2014 | Figoureux et al. |
| 8,894,050 | B2 | 11/2014 | Wootten et al. |
| 8,899,903 | B1 | 12/2014 | Saad et al. |
| 8,903,568 | B1 | 12/2014 | Wang et al. |
| 8,938,325 | B1 | 1/2015 | McGinnis et al. |
| 8,967,533 | B2 | 3/2015 | DeVaul et al. |
| 9,027,976 | B1 | 5/2015 | Tollenaere |
| 9,096,294 | B1 | 8/2015 | Dong et al. |
| 9,114,871 | B2 | 8/2015 | Woodworth et al. |
| 9,205,922 | B1 | 12/2015 | Bouwer |
| 9,223,008 | B1 | 12/2015 | Hartman et al. |
| 9,242,741 | B1 | 1/2016 | Cockell, II |
| 9,302,770 | B2 | 4/2016 | Burgess et al. |
| 9,676,481 | B1 | 6/2017 | Buchmueller |
| 9,688,404 | B1 | 6/2017 | Buchmueller et al. |
| 9,800,091 | B2 | 10/2017 | Nugent, Jr. et al. |
| 9,836,063 | B1 | 12/2017 | Bonawitz et al. |
| 9,881,506 | B1 | 1/2018 | Gentry |
| 10,023,312 | B2 * | 7/2018 | Repp .................. B64D 1/22 |
| 10,023,313 | B2 | 7/2018 | Behrens et al. |
| 10,451,504 | B2 * | 10/2019 | Campbell ............ G01C 19/661 |
| 10,519,013 | B2 | 12/2019 | Curran et al. |
| 2003/0085319 | A1 | 5/2003 | Wagner et al. |
| 2003/0222177 | A1 | 12/2003 | Bonisch |
| 2005/0072965 | A1 | 4/2005 | Sanderes et al. |
| 2005/0242237 | A1 | 11/2005 | Scott |
| 2007/0200032 | A1 | 8/2007 | Eadie et al. |
| 2009/0004004 | A1 | 1/2009 | Vincenzi |
| 2009/0152391 | A1 | 6/2009 | McWhirk |
| 2010/0012771 | A1 | 1/2010 | Jess |
| 2010/0176618 | A1 | 7/2010 | Souke et al. |
| 2010/0319910 | A1 * | 12/2010 | Ives .................. E21B 19/02 166/250.01 |
| 2011/0192932 | A1 | 8/2011 | Brenner et al. |
| 2012/0006779 | A1 | 1/2012 | Mills et al. |
| 2012/0145832 | A1 | 6/2012 | Schuster |
| 2012/0150364 | A1 | 6/2012 | Tillotson et al. |
| 2012/0292434 | A1 | 11/2012 | Welsh |
| 2012/0293177 | A1 | 11/2012 | Dodds |
| 2013/0054054 | A1 | 2/2013 | Tollenaere et al. |
| 2013/0056586 | A1 | 3/2013 | Occhiato et al. |
| 2013/0270393 | A1 | 10/2013 | Shrapnel |
| 2013/0299634 | A1 | 11/2013 | Haggard |
| 2014/0252170 | A1 | 9/2014 | Prud'homme-Lacroix |
| 2015/0041598 | A1 | 2/2015 | Nugent et al. |
| 2015/0151837 | A1 * | 6/2015 | Sane .................. B64D 1/12 701/3 |
| 2015/0360779 | A1 | 12/2015 | Behrens et al. |
| 2016/0009393 | A1 | 1/2016 | Repp et al. |
| 2016/0031683 | A1 | 2/2016 | Fenker et al. |
| 2016/0048131 | A1 * | 2/2016 | Lesperance .............. B64D 1/22 701/8 |
| 2016/0236779 | A1 | 8/2016 | Thomas et al. |
| 2016/0297650 | A1 | 10/2016 | Bang |
| 2016/0332728 | A1 | 11/2016 | Winfree et al. |
| 2016/0340039 | A1 | 11/2016 | Waltner et al. |
| 2017/0088261 | A1 | 3/2017 | Sequeira et al. |
| 2017/0138737 | A1 | 5/2017 | Cordova et al. |
| 2017/0284795 | A1 | 10/2017 | Carlson et al. |
| 2017/0291707 | A1 | 10/2017 | Veronesi et al. |
| 2018/0099748 | A1 | 4/2018 | Lesperance et al. |
| 2018/0229855 | A1 * | 8/2018 | Sane .................. G05B 17/02 |
| 2018/0252616 | A1 * | 9/2018 | Bryson .................. G01M 13/028 |
| 2018/0282130 | A1 | 10/2018 | Kale et al. |
| 2018/0339891 | A1 * | 11/2018 | Ijadi-Maghsoodi ..... B64D 1/22 |
| 2019/0031474 | A1 * | 1/2019 | Stilborn .................. B66C 13/16 |
| 2019/0193827 | A1 | 6/2019 | Zerweckh |
| 2019/0241267 | A1 | 8/2019 | Sikora et al. |
| 2019/0337776 | A1 * | 11/2019 | Fanello .................. B66C 23/44 |
| 2020/0231415 | A1 * | 7/2020 | Sikora .................. B66C 13/085 |

OTHER PUBLICATIONS

International Search Report dated Apr. 30, 2020, for PCT/US2020/017790, filed Feb. 11, 2020.

International Search Report dated May 27, 2020, for PCT/US20/19967, filed Feb. 26, 2020.

Written Opinion dated Apr. 3, 2019, for PCT/US19/13603, filed Jan. 15, 2020.

Written Opinion dated Apr. 30, 2020, for PCT/US2020/017790, filed Feb. 11, 2020.

(56) References Cited

OTHER PUBLICATIONS

Written Opinion dated May 27, 2020, for PCT/US20/19967, filed Feb. 26, 2020.
Young, L.A., "Enhanced Rescue Lift Capability," 63rd Annual Forum of the AHS International, Virginia Beach, VA, May 1-3, 2007 (May 2007). Fig. 2, 5, 12, 16, Abstract pp. 6-12.
International Search Report dated Oct. 6, 2020, for PCT/US2020/042936, filed Jul. 21, 2020.
Written Opinion dated Oct. 6, 2020, for PCT/US2020/042936, filed Jul. 21, 2020.

* cited by examiner

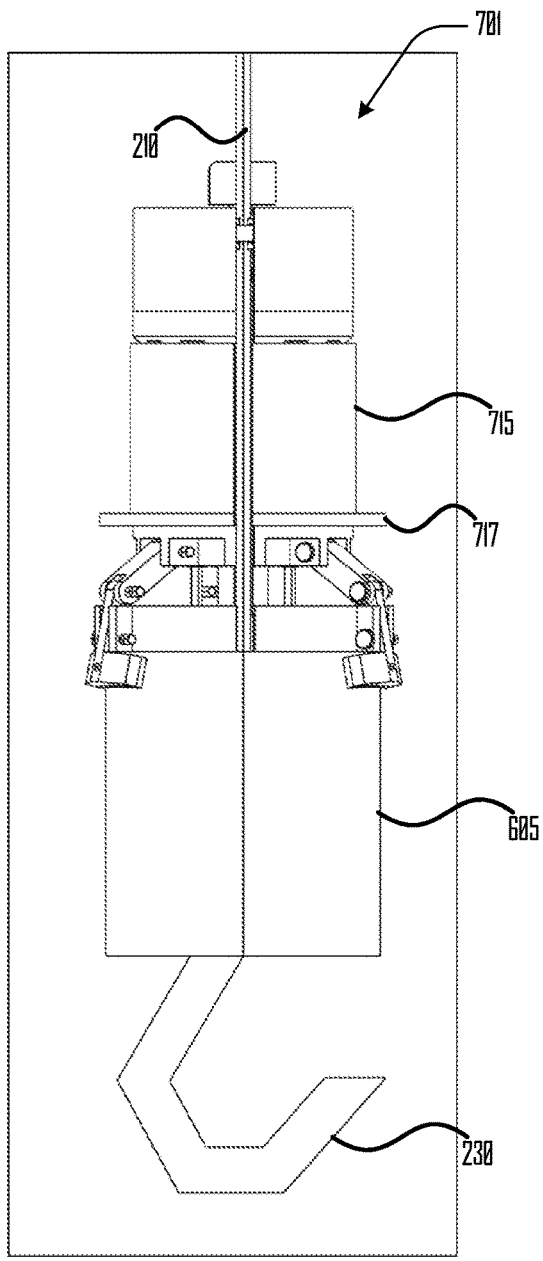
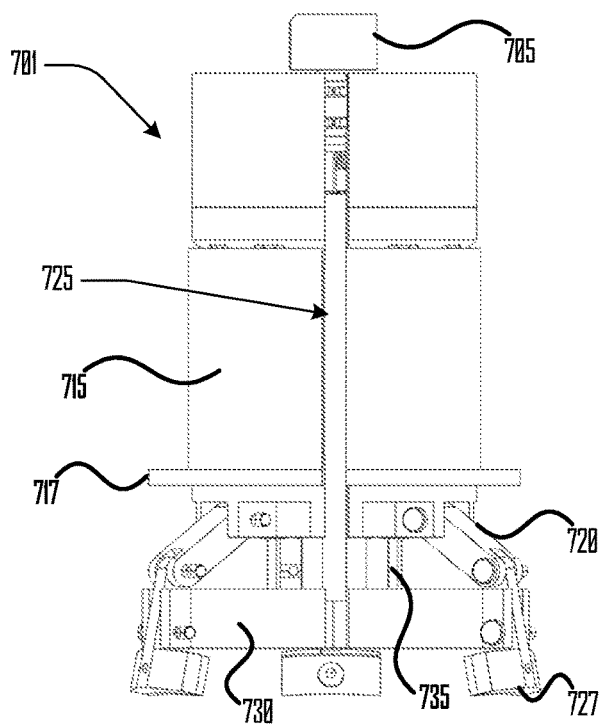
Fig.8B
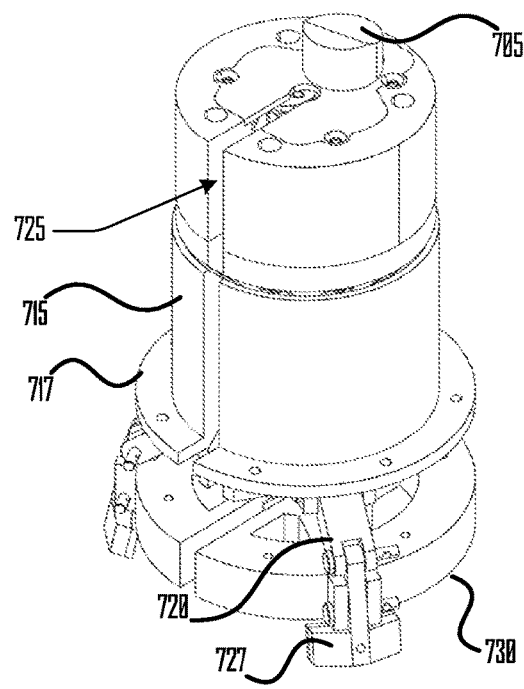
Fig.8A
Fig.8C

HOIST AND DEPLOYABLE EQUIPMENT APPARATUS, SYSTEM, AND METHOD

CROSS-REFERENCE TO RELATED APPLICATIONS

This application is a non-provisional patent application of and claims the benefit of the filing dates of U.S. provisional patent application No. 62/876,721, filed on Jul. 21, 2019, and U.S. provisional patent application No. 62/931,666, filed on Nov. 6, 2019, and incorporates the subject matter thereof by this reference.

FIELD

This disclosure is directed to improved systems and methods for and related to an apparatus, system, and method to control a hoist in a carrier and a mechanical system, such as a suspended load control system.

BACKGROUND

People and/or objects, such as equipment, ("loads") may be transported to or from a location as a load suspended by a suspension cable from a helicopter or crane or from a fixed-wing aircraft, using a hoist system. Cranes, helicopters, and fixed-wing aircraft may be referred to herein as "carriers". When a transportation operation is performed by a fixed-wing aircraft, the transportation operation may be performed by the fixed-wing aircraft orbiting an extraction point, with the suspension cable forming a spiral, with the center of the spiral brought to the general area of the extraction point by relocating the center of orbit of the orbiting fixed-wing aircraft. Loads are typically not buoyant, though may be. During operations by carriers, loads are subject to winds and other external and internal forces that may cause the load to move in an unstable, unpredictable, undesirable, and/or hazardous manner.

In hoist and sling operations or otherwise when transporting a suspended load by a carrier, observed motion of suspended loads includes the following components: vertical translation (motion up and down) along the Y axis (referred to herein as "vertical translation"); horizontal translation along either or both the X and Z axis; and rotation or "yaw" about the Y axis. Roll (rotation about the X axis) and pitch (rotation about the Z axis) may also occur, though if a load is suspended by a cable and is not buoyant, the typical motions are vertical translation, horizontal translation, and yaw. Vertical and horizontal translation may be caused by movement of the suspension cable, movement of the carrier, winding of a wench up or down relative to a carrier, movement of the load, differences in speed and momentum between the load and the carrier, by wind—including propeller wash—impacts, by interaction between the load and a spiraling suspension cable, and external forces. Horizontal translation can manifest as lateral motion or as conical pendulum motion of the load, with the pivot point of the pendulum where the cable is secured to the carrier ("pendular motion"); pendular motion generally also includes a component of vertical translation and may also be referred to as elliptical motion. During extraction operations by fixed-wing carriers, the bottom of the spiraling suspension cable may only approximately find the desired extraction point and the extracted load may be subject to undesirable "yo-yo" effects, in which the bottom of the spiral bobs up and down; "yo-yo" effects are also referred to herein with the term, "vertical translation".

Yaw, lateral motion, pendular motion, and vertical translation complicate lift operations, cause delays, injury, and can lead to death of aircrew, crane operators, and of people on the ground. Yaw can produce dizziness and disorientation in humans and non-human animals. Undesired vertical translation can result in a load, which may include a human, impacting the ground, impacting objects in the environment, or being subject to undesirable acceleration. Yaw, lateral and pendular motion, and vertical translation can also interfere with bringing a load into or delivering a load to a location. For example, delivery of a load to a deck of a ship may be complicated by pendular motion or yaw of the load, even if the deck is stable and is not also subject to heave, roll, or pitch, as it may be. For example, bringing a person in a litter into a helicopter or onto a helicopter strut may be hazardous if the litter is undergoing yaw or pendular motion as it is drawn up to the helicopter. One or more components of undesired motion of the load may increase in amplitude and/or frequency and otherwise grow more pronounced as a load is drawn up to the carrier and the suspension cable shortens. Horizontal translation, vertical translation, and pendular motion of a load can also interact with the carrier to produce dangerous reactive or sympathetic motion in the carrier.

In addition, some suspended load operations may involve an obstacle, such as a surface, cliff wall, building, bridge, tree limb, overhang, or other obstacle that may interfere with one or more of carrier, load, and/or suspension cable.

Carriers often operate or work with multiple pieces of equipment. One such piece of equipment may be a carrier hoist system. The hoist system on a carrier may be used to lift an object, such as a person, litter, load, or the like from the ground to the carrier, above; this may be referred to as a hoist operation. However, in the course of a hoist operation, multiple pieces of equipment may be used to aid or support the hoist operation, such as a suspended load control system ("SLCS"), jungle penetrator, or rescue stokes, or rescue litter. If deployed, this equipment may require a mechanism, such as a load hook, to secure the equipment to the hoist system and suspension cable. In legacy hoist operations, such mechanisms may require that a crew member in or of the helicopter physically connect the equipment to the appropriate component of the hoist system for the piece of the equipment to be used during the operation.

Mechanical and logical complexity of deployed equipment which may be secured to a suspension cable beneath a hoist of a carrier is increasing. For example, deployed equipment may perform services for a load and or for the carrier, such as an SLCS which may stabilize a load against rotation or pendular motion or control a position of the load relative to a target. For example, services may need to be performed for the deployed equipment, such as movement of the deployed equipment in one or more of the X, Y, and Z axis, reeling in or shortening the suspension cable, lengthening or paying out the suspension cable, recharging of batteries in or of the deployed equipment, and the like. Lack of integration between deployed equipment and the hoist and or carrier may require that many such services be provided by one or more people, such as crew of the carrier. Performance of such services may be inconvenient, distracting, or dangerous, whether to the crew, others in the carrier, and or for those on the ground. Inadequate integration between deployed equipment and hoist systems may result in, for example, prematurely discharged batteries, damage to equipment, surroundings, injury, loss of life, and failure of missions, including failure of life saving missions.

Lack of integration between deployed equipment and hoist may occur during, for example, helicopter sling load missions, firefighting, crane operations, navy re-supply missions between ships, deep sea drilling applications, aircraft inflight refueling operations, and fixed-wing hoist operations. Therefore, a need exists for greater integration between deployable equipment and hoist systems.

BRIEF DESCRIPTION OF THE DRAWINGS

FIG. 8A illustrates a view of a cable attachment mechanism secured to a suspension cable, in accordance with an embodiment.

FIG. 8B illustrates a detail view of the cable attachment mechanism of FIG. 8A, without the suspension cable, in accordance with an embodiment.

FIG. 8C illustrates a second view of the cable attachment mechanism of FIG. 8B, in accordance with an embodiment.

FIG. 156 illustrates an oblique view of a remote interface of an SLCS, in accordance with an embodiment.

DETAILED DESCRIPTION

Figure 1:
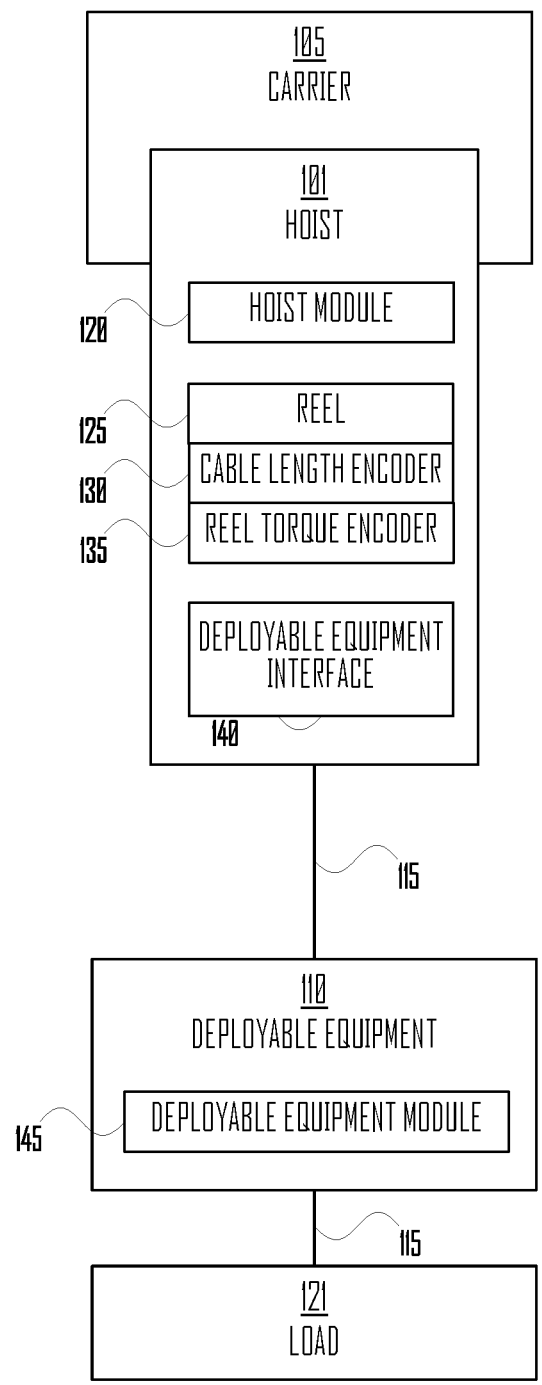
FIG. 1 illustrates a carrier, hoist, deployable equipment, and a load in accordance with an embodiment.

In various embodiments, as described further herein, an integrated hoist and deployable equipment addresses interaction between deployable equipment and hoist. For example, when integrated, deployable equipment may receive distance, weight, and or force data or information from a hoist. For example, when integrated, a deployable equipment may provide telemetry data or information to a hoist or another process. For example, when integrated, a deployable equipment may control a hoist. For example, when integrated, a deployable equipment may control a hoist in order to achieve an objective, such as an objective of the deployable equipment. For example, when integrated, a deployable equipment may be deployed from a hoist and onto a suspension cable without human interaction or with minimal human interaction. For example, when integrated, a deployable equipment may be docked in a hoist without human interaction or with minimal human interaction. For example, when integrated, a deployable equipment may obtain communications services from a carrier. For example, when integrated, a deployable equipment may obtain electricity and or battery recharging services from a carrier.

For example, the deployable system may be an SLCS. The SLCS may be at, or near, a location of a load suspended on a suspension cable below the hoist. The load may undergo pendular motion, rotation, or horizontal or vertical translation in response to movement of the carrier, interaction between the load and the suspension cable, and or external perturbation. The SLCS may control the load by dynamically controlling the hoist, such as a reel in the hoist, to reel in or pay out the suspension cable. The SLCS may control the load by dynamically exerting force from, for example, thrusters, fans, or propellers (for example, high output electric ducted fans) of the SLCS. Thrusters, fans, propellers and electric ducted fans may be referred to herein as "EDFs". Other sources of thrust may be used, such as jets, compressed air, hydrogen peroxide thrusters, rockets, and the like.

The SLCS may control itself and a load (herein, discussion of "control of a load" or "control of an SLCS" should be understood to refer to control of an SLCS and, thereby, as control of a load which may also be secured to the SLCS) by estimating current and near-term future state information and parameter information of the SLCS and load. Parameter information may comprise, for example, a mass of SLCS and load, cable length, and moment of inertia of an SLCS and load. State information may comprise, for example, a position, movement, and rotation of the SLCS and load, movement and rotation of the carrier, thrust output from fans or other thrust sources as well as disturbances, such wind force, sea state, and relative SLCS and helicopter motion. Parameter information, state information, and disturbance forces are not "hard-wired" into the SLCS, but are dynamically determined in order for the SLCS to change its behavior to address different operations and to address changing circumstances of a single operation.

When the SLCS or another deployable equipment can obtain at least some of the parameter information or state information from the hoist, such as the length of the suspension cable or the mass of the SLCS and load, it may be better able to estimate the parameter information and state information.

With this complex state and disturbance model, the SLCS may be better able to control a load by dynamically exerting force from, for example, a hoist, including a reel in the hoist, and or from EDF at, or near, a location of the load.

For example, reeling in or letting out of a suspension cable from a hoist may be used to obtain a desired elevation for a suspended load, to obtain a desired rate of change of elevation for a suspended load (including to reduce or eliminate "yo-yo" effect), to keep a desired tension on the suspension cable, to deploy the deployable equipment, to stow the deployable equipment, or the like. When a deployable equipment comprises an SLCS, vector thrust produced by EDFs may be used to counteract yaw and pendular motion, may be used to translate a load horizontally, such as to obtain a desired position or to avoid an obstacle or to move a load into an offset position relative to a normal lowest-energy hanging position or "fall line" below an attachment point of a suspension cable on a carrier, such as below an arm that holds the suspension cable. As used herein, "position" is synonymous with "location" and includes spatial coordinates in the x- y-, and z-axis.

An SLCS may be used to control the fine position and orientation, as well as its motion, independently from the carrier. As used herein, "motion" comprises motion in x-, y-, and z-axis as well as rotation. When integrated with the hoist, the deployable equipment, such as an SLCS, may also then use the hoist to control the z-axis of the SLCS and a load. Telemetry output from an SLCS may be used to provide feedback to a carrier crew or to processes executed by systems in a carrier. For example, the cable length estimated by an SLCS, or a location of an SLCS and load relative to a target or relative to the carrier may be output to a crew which controls a hoist or to a process which controls a hoist or to the hoist directly.

Consequently, an integrated hoist and deployable equipment may enhance mission performance and safety and may improve performance of carrier as the SLCS dynamically determines and controls suspension cable length, force on the cable, location and rotation of an SLCS and load, separate from motion of the carrier, and as the SLCS provides telemetry information which may be used during a suspended load operation.

Once deployed and in use, an integrated hoist and deployable equipment may be agnostic with respect to the platform from which the load is suspended (e.g., the characteristics of a helicopter "ownship", fixed-wing aircraft, drone, a crane, etc.), as it independently and dynamically determines hoist actions and or thrust necessary to deploy or stow the deployable equipment, to obtain a desired elevation, to obtain a desired change in elevation, to obtain a desired tension on the suspension cable, to stabilize the load or to achieve other objectives, such as to direct the load in a desired direction. This permits widespread adoption of the integrated hoist and deployable equipment regardless of carrier type, lowering cost and mitigating solution risks.

An integrated hoist and deployable equipment can provide benefits to, for example, helicopter search and rescue, MEDEVAC, sling load operations, forest fire helicopters, crane operations, construction sling load operations, civilian firefighting, and fixed-wing lift operations.

Control of deployable equipment may require determining parameters, such as cable length, the mass of the deployable equipment and or load, and the moment of inertial of the deployable equipment and or load, as well as state information, such as the position, orientation, and/or motion of the deployable equipment, of the carrier, and/or of a load, as well as potentially disturbing environmental conditions. A subset of parameter information or state information may be reported to another system; when so reported, such subset of information may be referred to as "telemetry data" or "telemetry information". Control of a carrier and/or components in a carrier, such as a wench or hoist which may be used in relation to deployable equipment, may also be improved with state or telemetry information related to deployable equipment, a load, and/or of a carrier. Deployable equipment may be used in contexts in which Global Position System (GPS) or other geolocation or radio navigation systems or other position and orientation systems, including cable length and forces on the cable, are unavailable, are compromised, or are subject to latency. Redundancy in state and telemetry information may also be desirable to increase reliability in implementation of control systems and to decrease latency in providing telemetry information to such systems.

Control of deployable equipment is different from control of other automated systems, such as cars and unmanned aerial vehicles, at least because deployable equipment may need to dynamically and recursively estimate parameter information and state information.

Disclosed herein are one or more apparatuses, systems, and/or methods to integrate a hoist and deployable equipment. The integrated hoist and deployable equipment may obtain certain parameter information from the hoist, such as cable length and forces on the hoist, such as mass. In addition to obtaining parameter information from the hoist, the deployable equipment may independently determine or estimate parameter information and may independently determine or estimate state information. The deployable equipment may provide some or all of independently determined information as telemetry data to one or more control apparatuses, systems, and/or methods which may be remote from the deployable equipment, including to the hoist.

As described further herein, these apparatus, systems, and/or methods may integrate information from a hoist, such as cable length and forces on the hoist, with machine-vision information and with other sensor information, such as from an inertial navigation system ("INS"), from LIDAR (possibly a portmanteau of "light and radar" or an acronym for "light detection and ranging"), from ultrasonic proximity sensors, from cameras or other machine-visions systems, and from other sensor input discussed herein to localize deployable equipment relative to a carrier, relative to a target location, or relative to another object. Information from the hoist may be provided by a reel of the hoist, such as by a cable length encoder and or a reel torque encoder. Machine-vision information may be produced through image capture by cameras in deployable equipment and object detection of the carrier and/or load in such images. When integrated with information from cameras, INS, LIDAR systems, localized relative parameter and state information (including distance below a carrier, elevation of the deployable equipment, forces on the suspension cable, relative orientation and position of the carrier, load and/or deployable equipment, and separate heading vectors of carrier and deployable equipment within a localized coordinate system) may be developed with low latency and high reliability. When absolute parameter or state information is available, such as from GPS or another radio navigation or absolute positioning system, absolute and relative localized information may be integrated. Integration of information from the hoist, machine-vision information, and information from inertial navigation, LIDAR, and/or absolute position systems may be performed using methods that comprise, for example, a Kalman Filter, such as an Unscented Kalman Filter ("UKF") and state model.

Reference is now made in detail to the description of the embodiments illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a fixed-wing lift operation, a helicopter sling load, search and rescue operations, and/or crane operations. However, these embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIG. 1 schematically illustrates hoist 101, carrier 105, deployable equipment 110, suspension cable 115, and load 121.

Carrier 105 may be, for example, a crane, a helicopter, a fixed-wing aircraft, a drone, or the like. Carrier 105 may comprise communication, power, and or control modules or systems, such as to communicate with and or provide power to hoist 101 and or deployable equipment 110. Carrier 105 may comprise structures to which hoist 101 may be secured Hoist 101 is illustrated as comprising hoist module 120, reel 125, cable length encoder 130, reel torque encoder 135, and deployable equipment interface 140.

Reel 125 may comprise a winch, a suspension cable, such as suspension cable 115, coiled around or to be coiled around the winch, an electrical or hydraulic motor to turn the winch, a brake to stop rotation of the winch, a winding guide, to guide cable as it winds onto or off of the winch, cable length encoder 130, and reel torque encoder 135. Cable length encoder 130 may encode or record a length of cable which is unwound from the winch, such as through use of physical, optical, or Hall sensors or the like which measure rotation of the winch and or a roller of the cable guide. Reel torque encoder 135 may encode or record forces on the winch, such as torque on the winch, whether under static conditions (e.g. when the winch is not rotating) or dynamic conditions (e.g. when the winch is rotating). Reel torque encoder 135 may comprise, for example, a strain gauge, a scale, a mass or weight measuring device, or the like. Reel torque encoder 135 and or host module 120 may estimate or determine a mass of a load on cable 115 based on the torque and or based on static or dynamic conditions.

Hoist 101 may comprise electrical components, including computer processors, computer memory, signal processing, logical components, and actuators, including reel 125 and other actuators. Such components are also discussed herein in relation to hoist logical components 1080.

Figure 13:
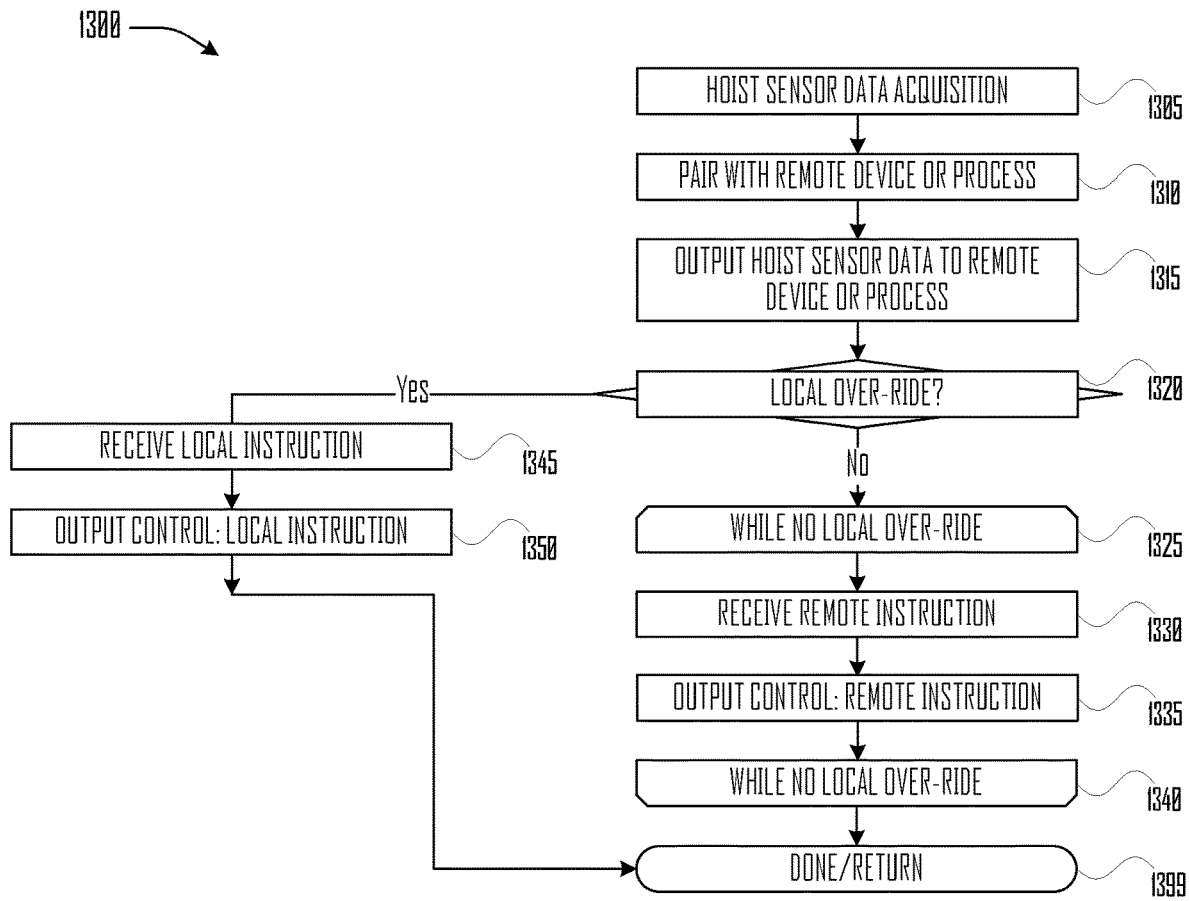
FIG. 13 illustrates hoist with integrated deployable equipment operational module, in accordance with an embodiment.

In computer memory or in logic embodied in circuits within hoist 101 may be hoist module 120. Hoist module 120 may comprise logic to operate hoist 101. Hoist module 120 may obtain data or information, such as from cable length encode 130 and reel torque encoder 135, and may provide this data or information to other components, such as deployable equipment 110 and or carrier 105. Hoist module 120 may receive data, information, or instructions from, for example, deployable equipment module 145 and or carrier 105 (including from crew in carrier 105). Hoist module 120 may implement instructions, such as to wind in or unwind (or pay out) suspension cable 115, to communicate with deployable equipment 110, and or to control or use deployable equipment interface 140. An example of logic of hoist module 120 is illustrated in FIG. 13 with hoist with integrated deployable equipment operational module 1300.

Deployable equipment interface 140 comprises one or more interfaces for or to deployable equipment 110, such as a communication interface, an electrical interface, or a docking interface. The communication interface may provide a signal communication to deployable equipment, including over wireless or wireline communication media. The electrical interface may provide or obtain electrical power to or from deployable equipment. The docking interface may comprise a dock for deployable equipment; the dock for deployable equipment may comprise components, including physical structures and or actuators, to secure or release the deployable equipment within or to the hoist or within or to carrier.

Deployable equipment 110 may comprise, for example, an SLCS, a sensor suite, or other equipment which may comprise electrical components, including computer processors, computer memory, signal processing, batteries, logical components, and actuators. Examples of such equipment are discussed herein in relation to hoist and suspended load control system 1001. Examples of deployable equipment 110 discussed herein include an SLCS, though deployable equipment 110 may not be limited to an SLCS.

In computer memory or in logic embodied in circuits within deployable equipment 110 may be deployable equipment module 145. Deployable equipment module 145 may provide services to and obtain services from carrier 105, hoist 101, load 121, or another object or party. For example, deployable equipment module 145 may provide load control services, such as when deployable equipment module 145 is or comprises operational module 1100 or hoist and deployable equipment data fusion and control module 1200.

Deployable equipment 110 may provide services to carrier 105, to hoist 101, to load 121, or to another object or party. Services provided by deployable equipment 110 may include, for example, data acquisition, such as data acquisition for telemetry or situational awareness, as well as load control, such as load control services for load 121, communications, and the like. Deployable equipment 110 may require or benefit from services from carrier 105, from hoist 101, from load 121, or from another object or party. Services to deployable equipment 110 may include, for example, data or information, communication, electrical power, physical translation, and docking and deployment to and from the carrier.

Load 121 may comprise an animate or inanimate object, such as a person, equipment, a sling transporting or to transport an object, a litter, a container for water or another liquid or gas, or the like. Load 121 may be secured to suspension cable 115, such as via a hook, or to another cable or securement mechanism of deployable equipment 110. A weight or mass of load 121 may change during an operation, such as when part of a load is picked up, put down, or released.

Figure 2:
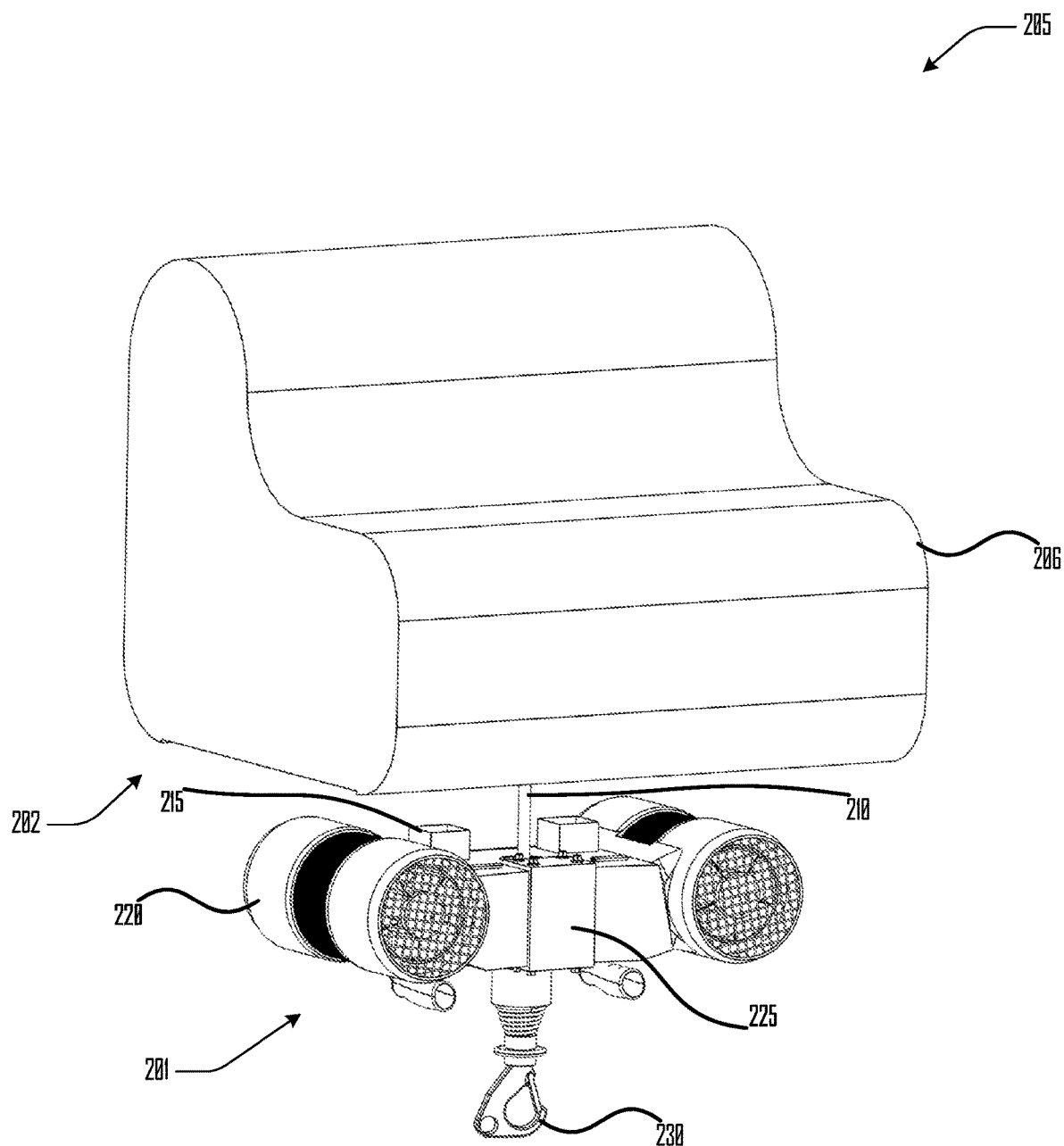
FIG. 2 illustrates a hoist, a dock for deployable equipment, and a deployable equipment in a deployed configuration, in accordance with an embodiment.

FIG. 2 illustrates hoist 205, dock 202 for deployable equipment, deployable equipment 201, and suspension cable 210 in a deployed or partially deployed configuration.

Hoist 205 is illustrated as comprising housing 206 which may act as or comprise components for dock 202; housing 206 may isolate components within hoist 205 from the environment. Hoist 205 may be secured to a carrier, whether in an interior space of carrier, on an external structure of carrier, or the like, by securement hardware, by a boom, by an arm, or the like, coupled directly or indirectly to a carrier. Housing 206 may house or include components to deliver or retrieve deployable equipment and or an attached payload or load. For example, such components may comprise a motor, a motor controller, such as hoist module 120, suspension cable 210, a winding spool or reel, cable anchors, cable guides, and the like.

Deployable equipment 201 is illustrated as comprising, for example, fan unit 220. Fan unit 220 may comprise one or more thrusters, such as EDFs. Deployable equipment 201 may comprise logical components, such as computer processors, memory, and modules in memory, such as a deployable equipment module 145. Such logical components may be used or directed by deployable equipment 201 or modules thereof, such as when in an autonomous or semi-autonomous mode, and or by people or other equipment, to provide services. In the example illustrated in FIG. 2, deployable equipment 201 is an SLCS and may provide load and hoist control services to a load and or to a carrier; load and hoist control services may include control of hoist 205. Modules for providing load and hoist control services include deployable equipment operational module 1100, and hoist and deployable equipment data fusion and control module 1200.

Deployable equipment 201 is illustrated as comprising deployable equipment dock interface 215. Deployable equipment dock interface 215 may be secured or docked to hoist dock interface 415, discussed herein. Deployable equipment dock interface 215 may be an interface through which deployable equipment provides or obtains communications services, including through wireless and wireline media, obtains electrical power services, and or through which physical connection or physical securement services from hoist 205 and or a carrier may be made.

Deployable equipment 201 is illustrated as comprising cable securement mechanism 225. Cable securement mechanism 225 may be used to releasably secure deployable equipment 201 to cable 210. Examples of cable securement mechanism 225 are discussed herein, such as in relation to cable attachment mechanism 701.

Figure 3:
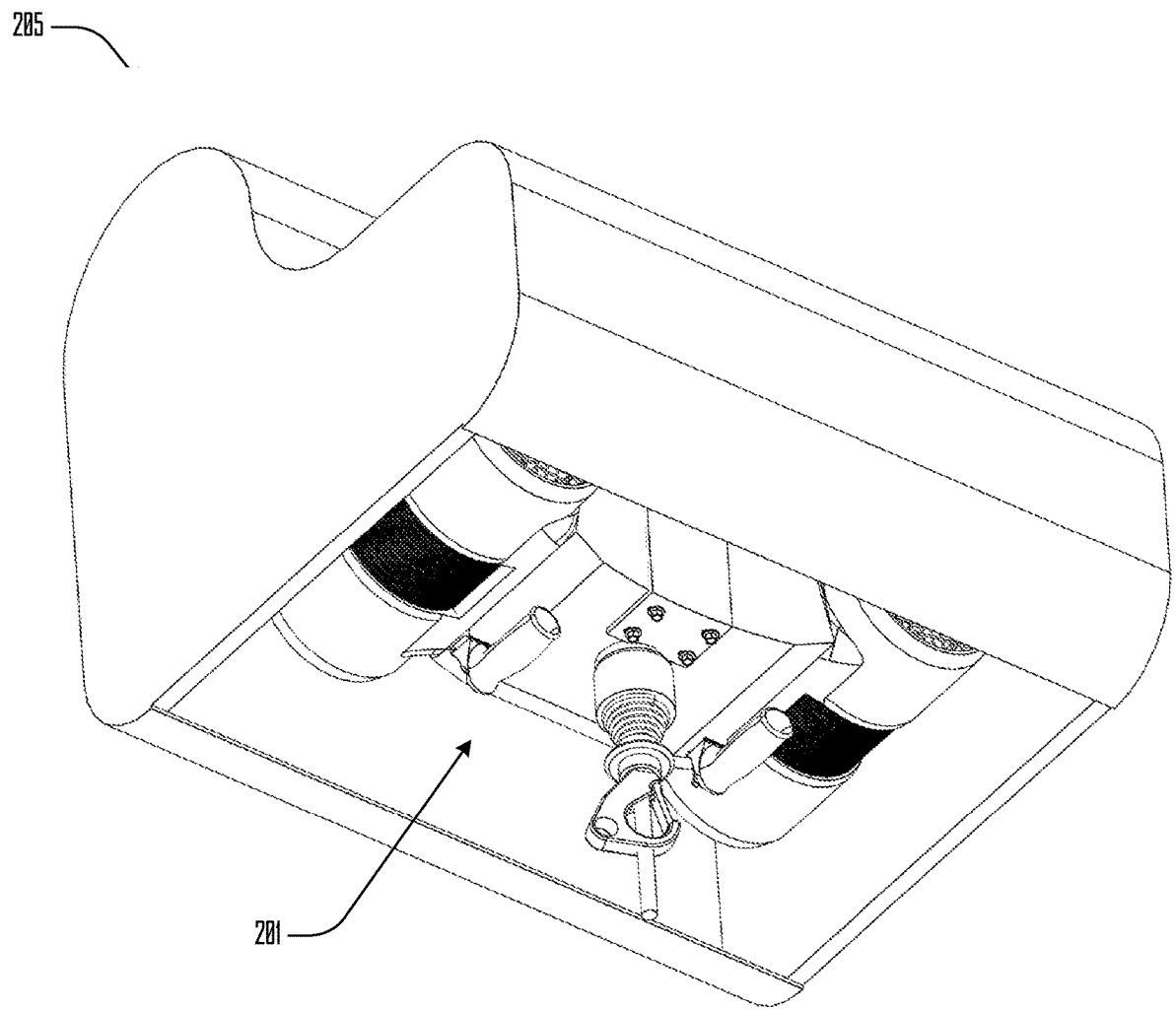
FIG. 3 illustrates a hoist, a dock for deployable equipment, and a deployable equipment in a stowed configuration, in accordance with an embodiment.

FIG. 3 illustrates hoist 205 and deployable equipment 201 in a docked or stowed configuration.

Figure 4:
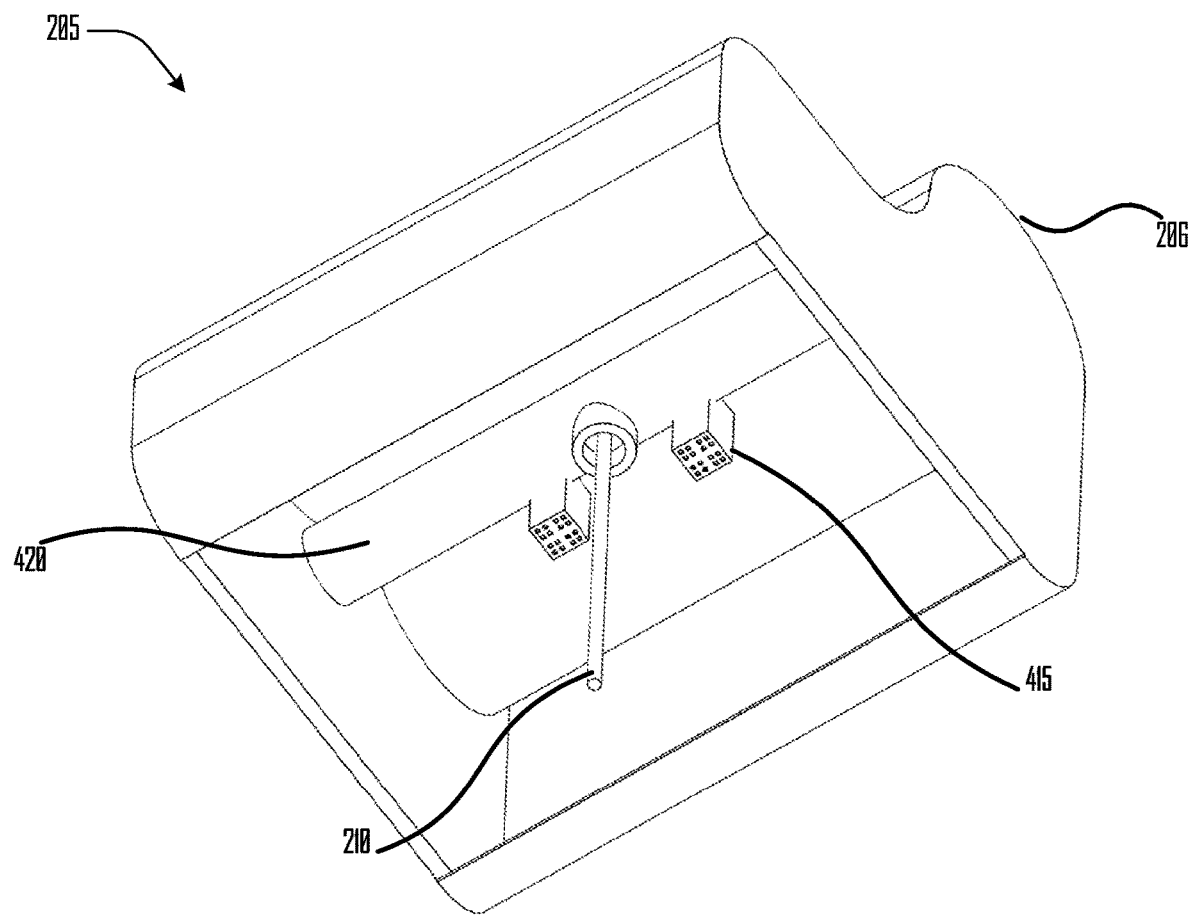
FIG. 4 illustrates a hoist, a dock for deployable equipment, a reel, and a deployable equipment interface, in accordance with an embodiment.
Figure 16A:
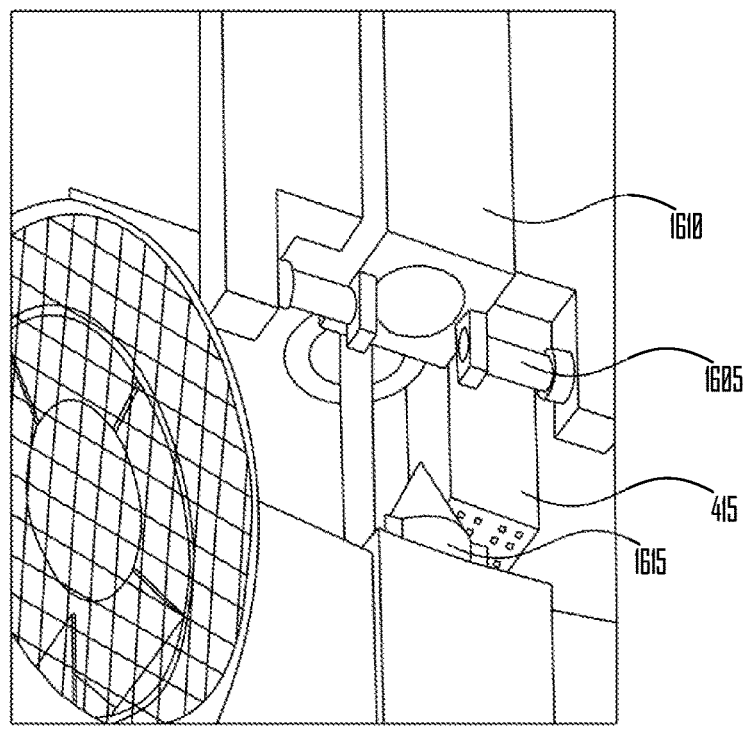
FIG. 16A illustrates a docking interface in an undocked configuration, in accordance with an embodiment.
Figure 16B:
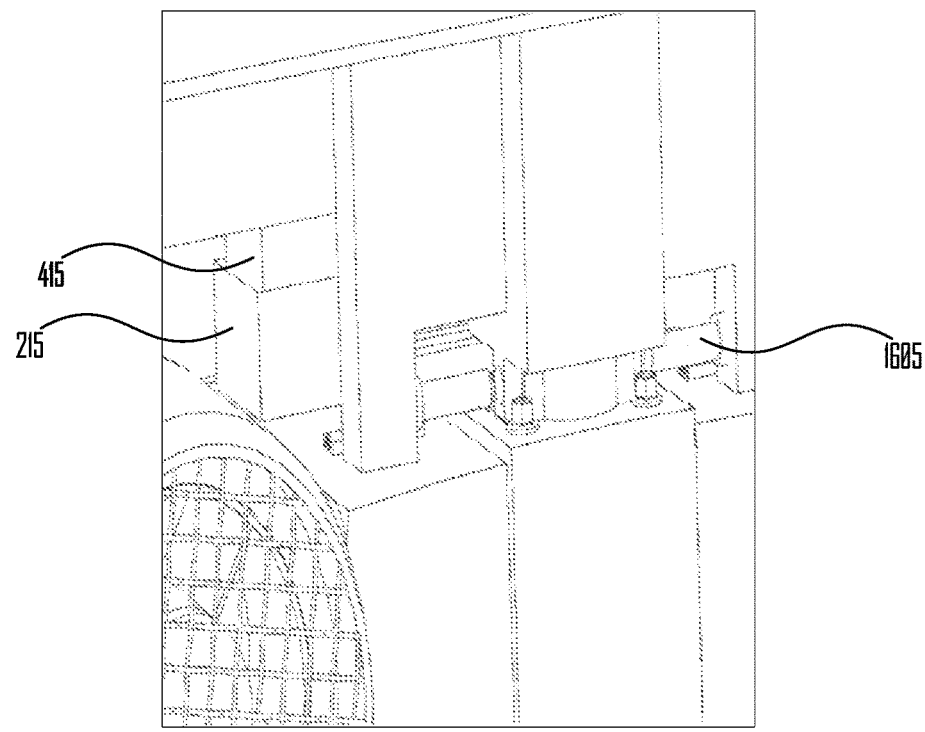
FIG. 16B illustrates a docking interface in a docked configuration, in accordance with an embodiment.

FIG. 4 illustrates hoist 205, housing 206, hoist dock interface 415, reel or reel housing 420 ("reel 420"), and suspension cable 210. Reel 420 may comprise a motor, a motor controller, suspension cable 210, a winding spool or reel, cable anchors, cable guides, and the like. Hoist dock interface 415 may be an interface through which hoist 205 may provide or obtain services in relation to deployable equipment, such as communications services, including through wireless and wireline media, electrical power services, and or physical connection or physical securement services. Components of hoist dock interface 415 may not be illustrated, such as components for physical connection or physical securement services. Further examples of components for physical connection or physical securement services between a hoist and a deployable equipment are discussed further herein, such as in relation to docking interface 1600, discussed in relation to FIG. 16. Reel 420 and hoist dock interface 415 may be controlled by logic embodied in computer memory or in logic embodied in circuits hoist 205, an example of which is discussed and illustrated in relation to FIG. 13 and hoist with integrated deployable equipment operational module 1300.

Figure 5:
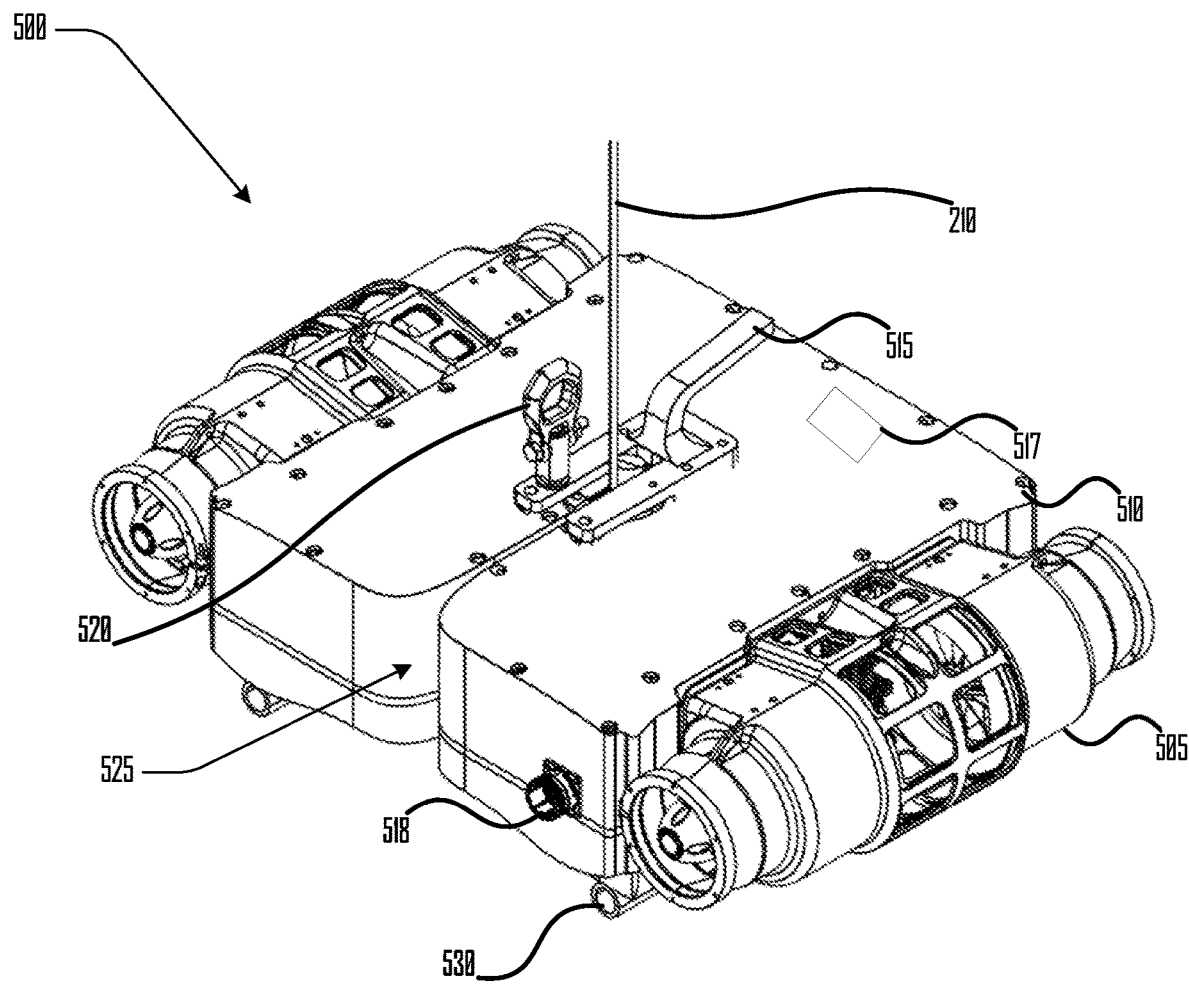
FIG. 5 illustrates a first view of a deployable equipment secured to a suspension cable, in accordance with an embodiment.

FIG. 5 illustrates a first view of deployable equipment 500 secured to suspension cable 210, in accordance with an embodiment. In the example illustrated in FIG. 5, deployable equipment 500 comprises an SLCS. Deployable equipment 500 comprises fan unit 505, skid 530, deployable equipment interface 518, deployable equipment interface 517, handle 515, securement mechanism 520, deployable equipment housing 510, and cable channel 525.

Deployable equipment 500 comprises electrical components, including computer processors, computer memory, signal processing, logical components, power supply and or batteries, electronic speed controllers, microcontrollers, sensors, actuators, and the like. The power supply within deployable equipment 105 may be a single power brick or an array of battery cells wired in series and/or in parallel, such as lithium-polymer (LiPo) cells. The batteries may be removable for inspection and/or to swap discharged and charged batteries. Batteries may be charged while installed (i.e., without having to remove them) via nodes or a wireless charging system. Batteries may include auxiliary battery (ies) to supply a steady supply of power to the processor even if thrusters in fan units draw a relatively large amount of power from main batteries. In embodiments, a carrier from which the deployable equipment is suspended, such as a helicopter, crane, or fixed wing aircraft, can provide power through a line extending down the suspension cable to the deployable equipment. In embodiments, the carrier can provide some power to the deployable equipment, while the deployable equipment may obtain other power from an on-board power supply. In various embodiments, the deployable equipment may be powered by a combination of on-board and remote power. In many environments, all power for the deployable equipment is contained on board the deployable equipment, allowing fully autonomous operation without dependence on the availability of external power sources or delivery means.

Actuators visible in FIG. 5 comprise fan unit 505; a similar fan unit is on another side of deployable equipment 500. As illustrated in this example, fan unit 505 may comprise two EDF.

Fan units 505 may comprise a cowl which protects one or more EDF. The cowl may be hardened, to withstand impact with the environment. The cowl unit may be made of metal, plastics, composite materials, including fiber reinforced resin, and the like. Fan units may include an air intake, though which air may be drawn, and an outlet. An air intake may comprise one or more screens or filters to prevent entry of some objects into EDF. The EDF in a fan unit may comprise blades and motor(s), such as electric motor(s). The electric motors within an EDF may be sealed against dust, sand, water, and debris. In addition to or in replacement of EDF, alternative sources of thrust may be used, such as, for example, compressed air, hydrogen peroxide jets or thrusters, liquid or solid rocket engines, fans driven by combustion engines, such as jet engines, and the like.

For the sake of convenience in discussing them, fan units on a first side of an SLCS may be discussed as a first fan unit group while fan units on a second side may be discussed as a second fan unit group. The fan units in each fan unit group propel thrust fluid (such as air) in fixed directions, such as fixed directions opposite each other; e.g. offset by 180 degrees. In other embodiments, a fewer or greater number of fan units and/or EDF may be used in an SLCS. In other embodiments, the fan units and/or EDF may be aligned other than offset by 180 degrees, e.g., offset by greater or fewer than 180 degrees, with or without offset along other of the axis. A mechanical steering component may be included to dynamically reposition a fan unit and/or EDF within a fan unit.

EDF in individual of the fan units may be activated separately, with different power, to produce thrust vectoring or thrust vector control of an assembly of fan units. For example, to produce clockwise yaw (relative to looking down on a top of SLCS FIG. 5), an EDF in the first fan unit group, may be activated by itself or in conjunction with an opposing EDF in the second fan unit group. To produce lateral translation of SLCS 105 or to produce lateral force opposing pendular motion, EDF in both fan unit groups with a same orientation may be activated. Simultaneous lateral force and rotational force may be produced. Vectored thrust may be generated by a deployable equipment module.

In computer memory or in logic embodied in circuits within deployable equipment 500 may be a deployable equipment module. Examples of deployable equipment module are illustrated and discussed in relation to operational module 1100 of FIG. 11 or hoist and deployable equipment data fusion and control module 1200 of FIG. 12. In the examples discussed herein, the deployable equipment module may control EDF in fan unit 505 to control a load, wherein the load may be secured above or below deployable equipment 500.

Cable channel 525 may be used, potentially in conjunction with handle 515, to pass suspension cable 210 through deployable equipment 500, whereupon a cable attachment mechanism, such as cable attachment mechanism 701 (discussed herein), may be used to secure deployable equipment 500 to or around suspension cable 210.

Securement mechanism 520 may be used, potential in conjunction with handle 515, to carry, hold, or secure deployable equipment 500, such as during transportation to a carrier or within the carrier, prior to deployment of deployable equipment 500.

Deployable equipment interface 517 and deployable equipment interface 518 may be an interface through which deployable equipment 500 provides or obtains communications services, including through wireless and wireline media, and or obtains electrical power services, similar to deployable equipment dock interface 215, discussed herein.

Figure 6A:
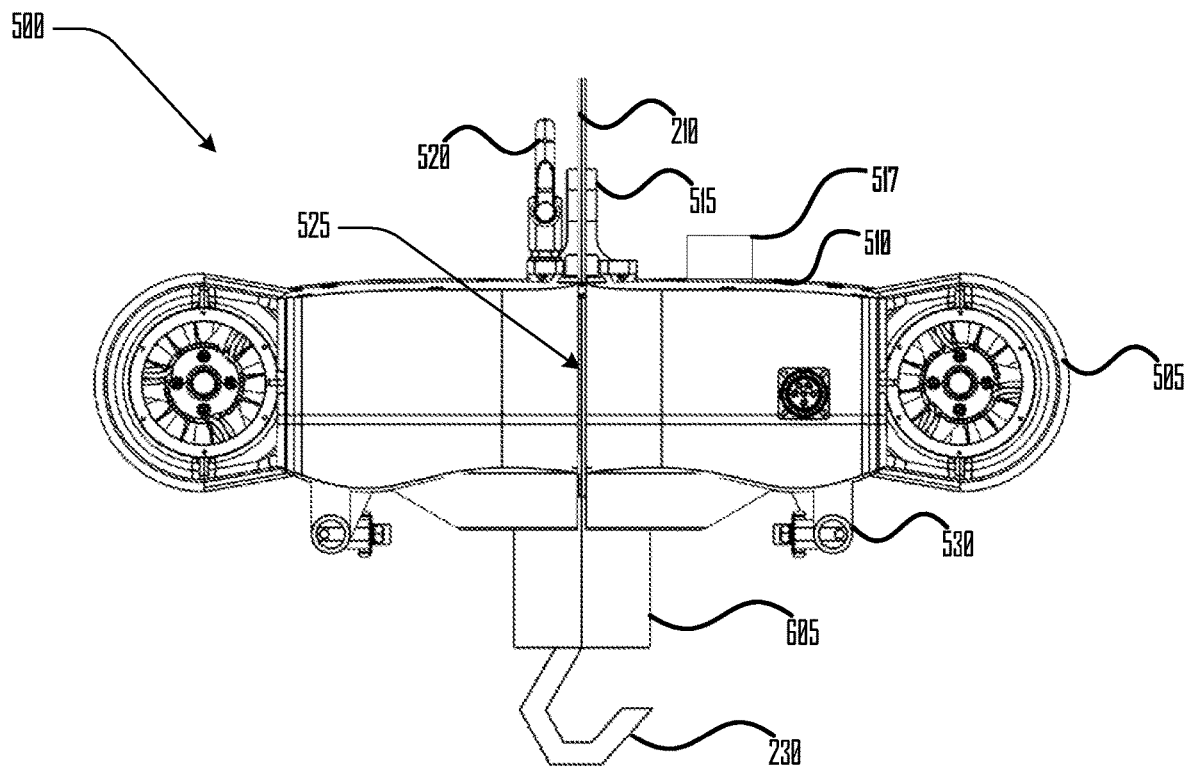
FIG. 6A illustrates a second view of the deployable equipment secured to the suspension cable of FIG. 5, in accordance with an embodiment.

FIG. 6A illustrates a front elevation view of deployable equipment 500, further showing bumper 605 and hook 230. Equipment such as bumper 605 and or hook 230 may be referred to herein as "terminal equipment of a suspension cable" or "terminal equipment". Bumper 605 may be a block or bumper secured to an end of suspension cable 210. Hook 230 may be secured to or integrally a part of bumper 605. A rotatory bearing or coupling may allow bumper 605 to rotate separately from cable 210. A rotatory bearing or coupling may allow hook 230 to rotate separately from bumper 605. Deployable equipment 500 may be seated on or secured to terminal equipment of a suspension cable, such as bumper 605, such as via a coupling to terminal equipment of the suspension cable. An example of a coupling to terminal equipment of the suspension cable is discussed in relation to coupling to terminal equipment of a suspension cable, or flange 1705 in FIG. 17A. Terminal equipment of the suspension cable may comprise a seat to receive or secure deployable equipment 500 to terminal equipment of the suspension cable; an example of which is illustrated and discussed in relation to deployable equipment seat of a terminal equipment of a suspension cable 1710 in FIG. 17B.

Figure 6B:
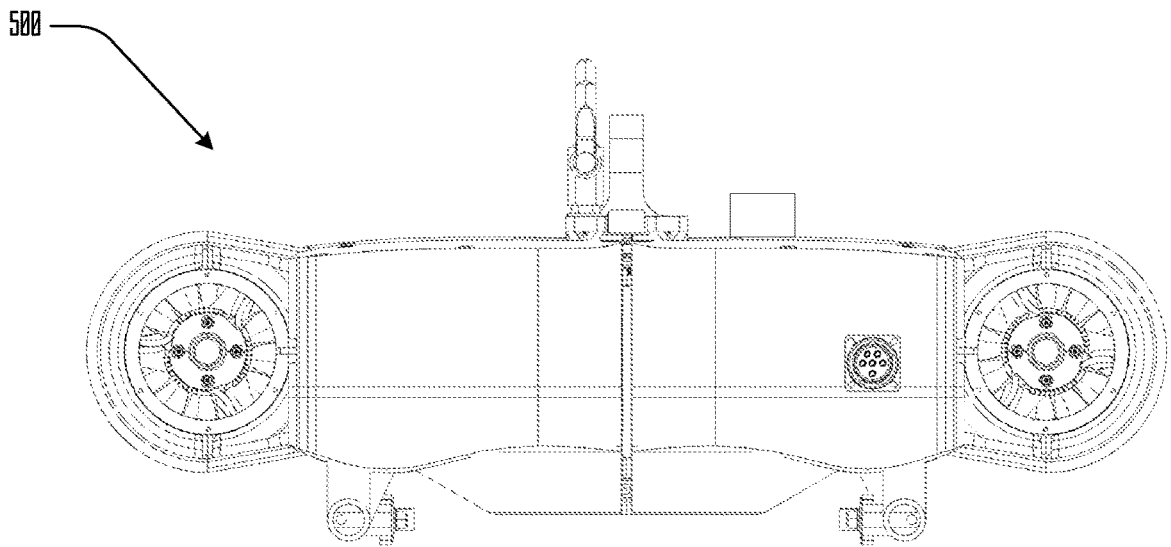
FIG. 6B illustrates the second view of the deployable equipment of FIG. 5, without the suspension cable, in accordance with an embodiment.

FIG. 6B illustrates deployable equipment without suspension cable 210, bumper 605, and hook 230, for the sake of clarity.

Figure 7A:
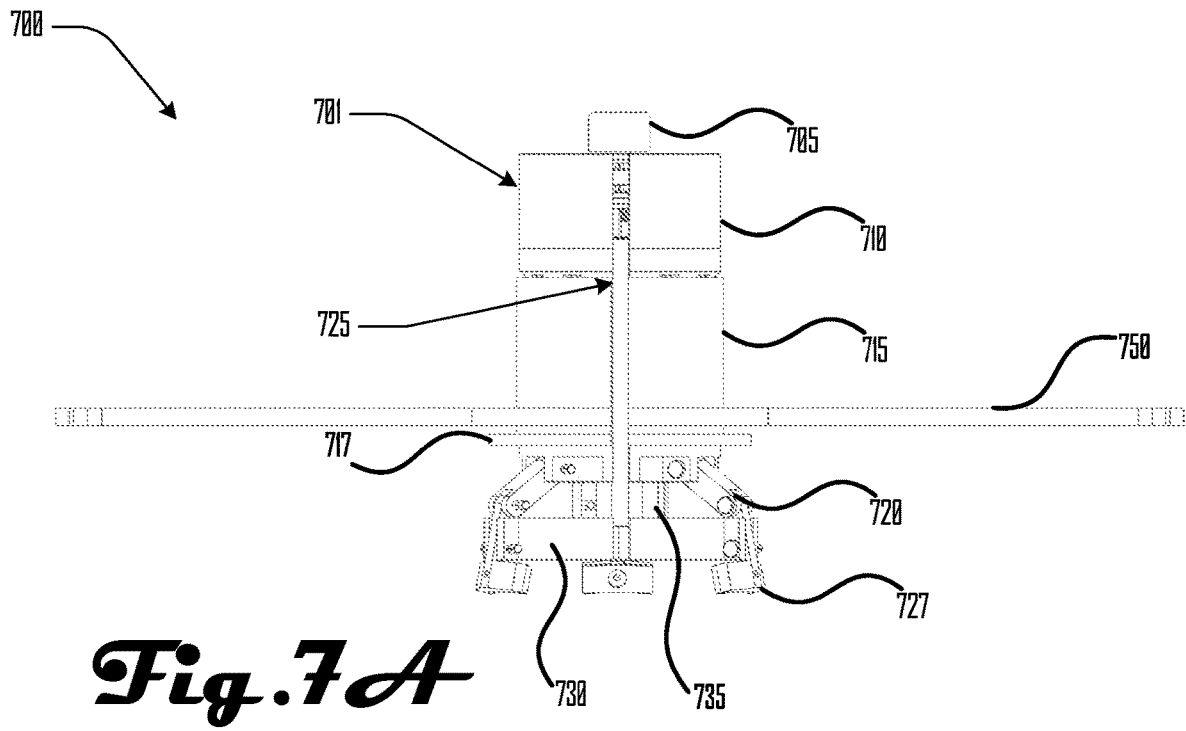
FIG. 7A illustrates a view of a frame for a deployable equipment and a cable attachment mechanism, in accordance with an embodiment.

FIG. 7A illustrates a front elevation of a frame for deployable equipment 750 and cable attachment mechanism 701.

Figure 7B:
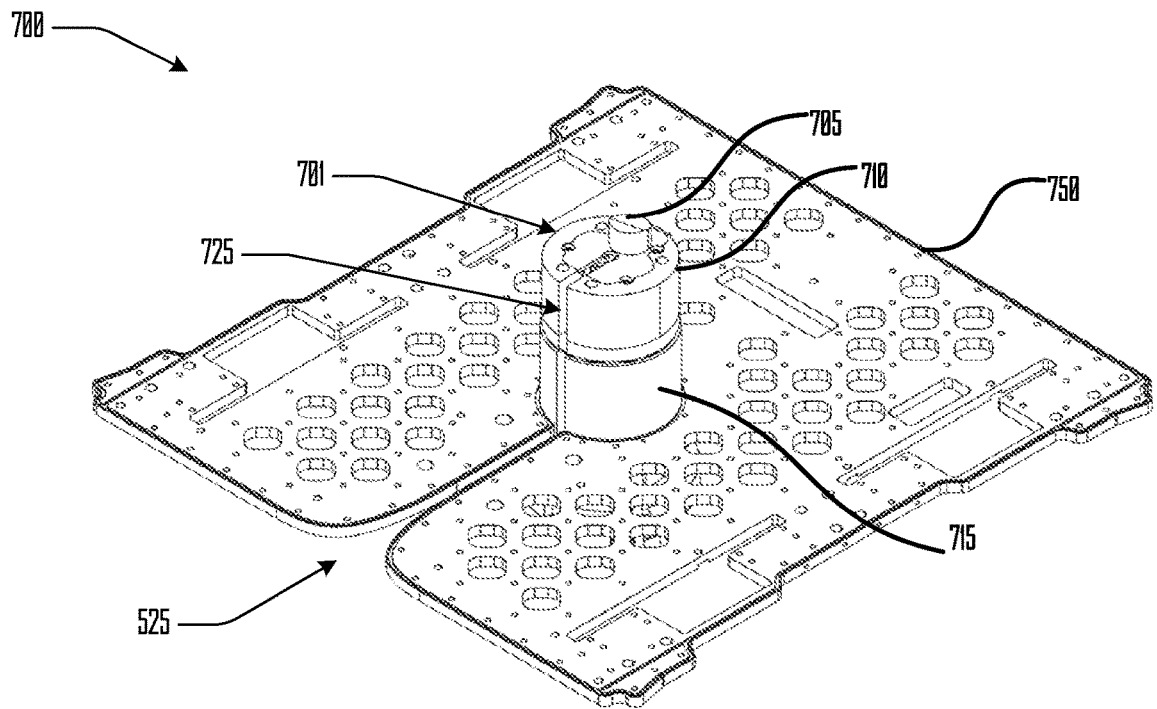
FIG. 7B illustrates a second view of the frame for the deployable equipment and the cable attachment mechanism of FIG. 7A, in accordance with an embodiment.

FIG. 7B illustrates an isometric view of the frame for deployable equipment 750 and cable attachment mechanism 701 of FIG. 7A.

In FIG. 7A and FIG. 7B, frame for deployable equipment 750 and cable attachment mechanism 701 may, for example, be within or secured to deployable equipment housing 510 of deployable equipment 500.

Cable attachment mechanism 701 may releasably secure deployable equipment, such as deployable equipment 500, to a suspension cable, such as suspension cable 210. Cable attachment mechanism 701 may further separate rotation of deployable equipment from rotation of suspension cable, such that deployable equipment does not twist suspension cable, which may be unsafe, damaging to, or otherwise undesirable for a suspension cable. Cable attachment mechanism 701 may further releasably secure deployable equipment to a terminal equipment of a suspension cable.

Illustrated in FIG. 7A and FIG. 7B are activation mechanism 705, cable-clamp housing 710, rotary coupling 715, frame for deployable equipment 750, cable channel in cable attachment mechanism 725, rotary coupling flange 717, lever arm 720, clasp 727, coupling to terminal equipment 730, and engagement-disengagement rods 735.

FIG. 8A illustrates a front elevation of cable mechanism 701 without frame for deployable equipment 750, and with suspension cable 210, for the sake of clarity.

FIG. 8B illustrates a front elevation of cable attachment mechanism 701 by itself, for the sake of clarity.

FIG. 8C illustrates an isomorphic view cable attachment mechanism 701 by itself, for the sake of clarity.

Figure 9A:
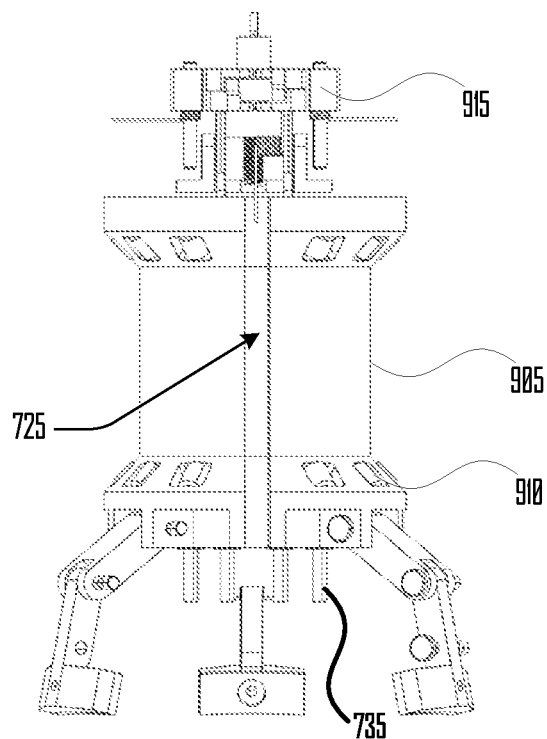
FIG. 9A illustrates a view of components of a cable attachment mechanism, in accordance with an embodiment.

FIG. 9A illustrates a front elevation of components of cable attachment mechanism 701. In addition to components illustrated and discussed in relation to other figures, illustrated in FIG. 9A are cable retention fingers 915, fixed core 905, and bearings 910.

Figure 9B:
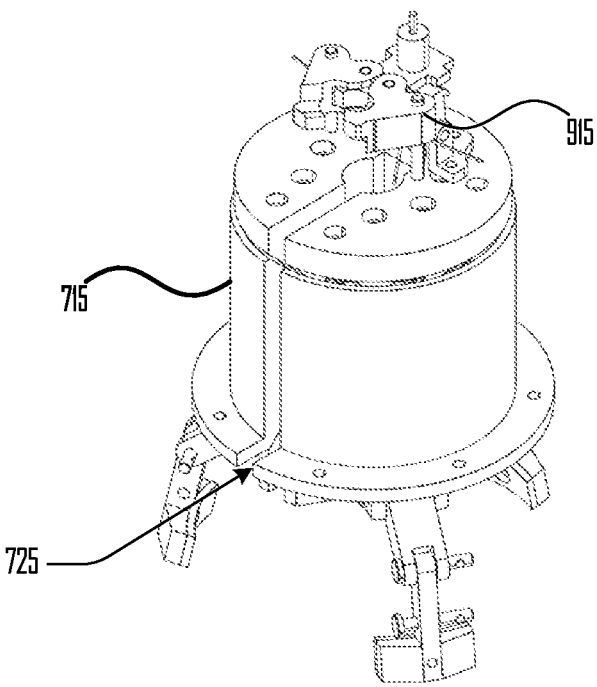
FIG. 9B a second view of components of the cable attachment mechanism of FIG. 9A, in accordance with an embodiment.

FIG. 9B illustrates an isomorphic view of components of cable attachment mechanism 701.

FIGS. 7A through 9B illustrate that a suspension cable may pass through cable channel 525 and though cable channel in cable attachment mechanism 725 to a center of cable attachment mechanism 701. Fingers 915 may be engaged to retain and or clamp the suspension cable within the center of cable attachment mechanism 701. Fingers 915 may be engaged by an actuator, such as by activation mechanism 705 or another actuator; such actuator may, for example, be electrical or human-powered.

To prevent or reduce transfer of rotational forces between the suspension cable and the deployable equipment, deployable equipment may be secured to frame for deployable equipment 750 and frame for deployable equipment 750 may be secured to rotary coupling 715. Rotary coupling 715 may wrap around fixed core 905, and rotate separately therefrom on bearings 910, or the like. Fixed core 905 may be releasably secured to terminal equipment of a suspension cable, such as by coupling to terminal equipment 730, lever arm 720, and clasp 727. Embodiments of coupling to terminal equipment 730 are discussed herein in relation to FIG. 17A, FIG. 17B. Coupling to terminal equipment 730, lever arm 720, and clasp 727 may be engaged or disengaged to contact and hold or to release terminal equipment through engagement-disengagement rods 735, or the like. Activation of engagement-disengagement rods 735 may be via an actuator, such as activation mechanism 705, or the like. Activation mechanism 705 may be powered by electricity, as in the case of an electric motor, linear actuator, or the like, may be powered by hydraulic power, or may be powered by human or manual input. Activation mechanism 705 may simultaneously or separately engage or disengage cable retention fingers 915, coupling to terminal equipment 730, lever arm 720, and clasp 727, relative to terminal equipment of a suspension cable.

In this manner, cable attachment mechanism 705 may bear the mass of deployable equipment on a core of cable attachment mechanism, wherein the core may be coupled to terminal equipment of the suspension cable, and wherein the terminal equipment may transfer rotational force to suspension cable. Though bearing the mass of deployable equipment on the terminal equipment, bearings of the core, such as bearing 910, allow deployable equipment to rotate, without transferring force, or significant force, such as torque, to the suspension cable.

With elements discussed herein, deployable equipment may be attached to a load, such as by straps or cables and may be able to rotate the load or rotate with the load on the suspension cable. A rotatory bearing or coupling between the hook and the suspension cable may thereby allow the load, terminal equipment, e.g. bumper and hook, and deployable equipment to rotate separately from cable. For example, when the deployable equipment is an SLCS, the SLCS may be able to control a load, such as a litter, though the load may be subject to rotation or may be rotated by the SLCS, without transfer of a rotational force to suspension cable.

With elements discussed herein, deployable equipment may be retained within hoist, carrier, or proximate to carrier, and deployed on suspension cable, with minimal human or crew effort and by or with involvement of deployable equipment module.

With elements discussed herein, deployable equipment and deployable equipment module may obtain data and information from a hoist and may improve the function and operation of the deployable equipment.

With elements discussed herein, deployable equipment and deployable equipment module may control a hoist, such as a reel of a hoist, to control a z-axis of a terminal end of suspension cable. Control of the z-axis may be, for example, to control an elevation of a load, such as relative to carrier, ground, or an objective or target. Control of the z-axis may be, for example, to control a tension on or of suspension cable. Control of the z-axis may be, for example, to control a rate of ascent or descent of a terminal end of suspension cable.

Figure 10:
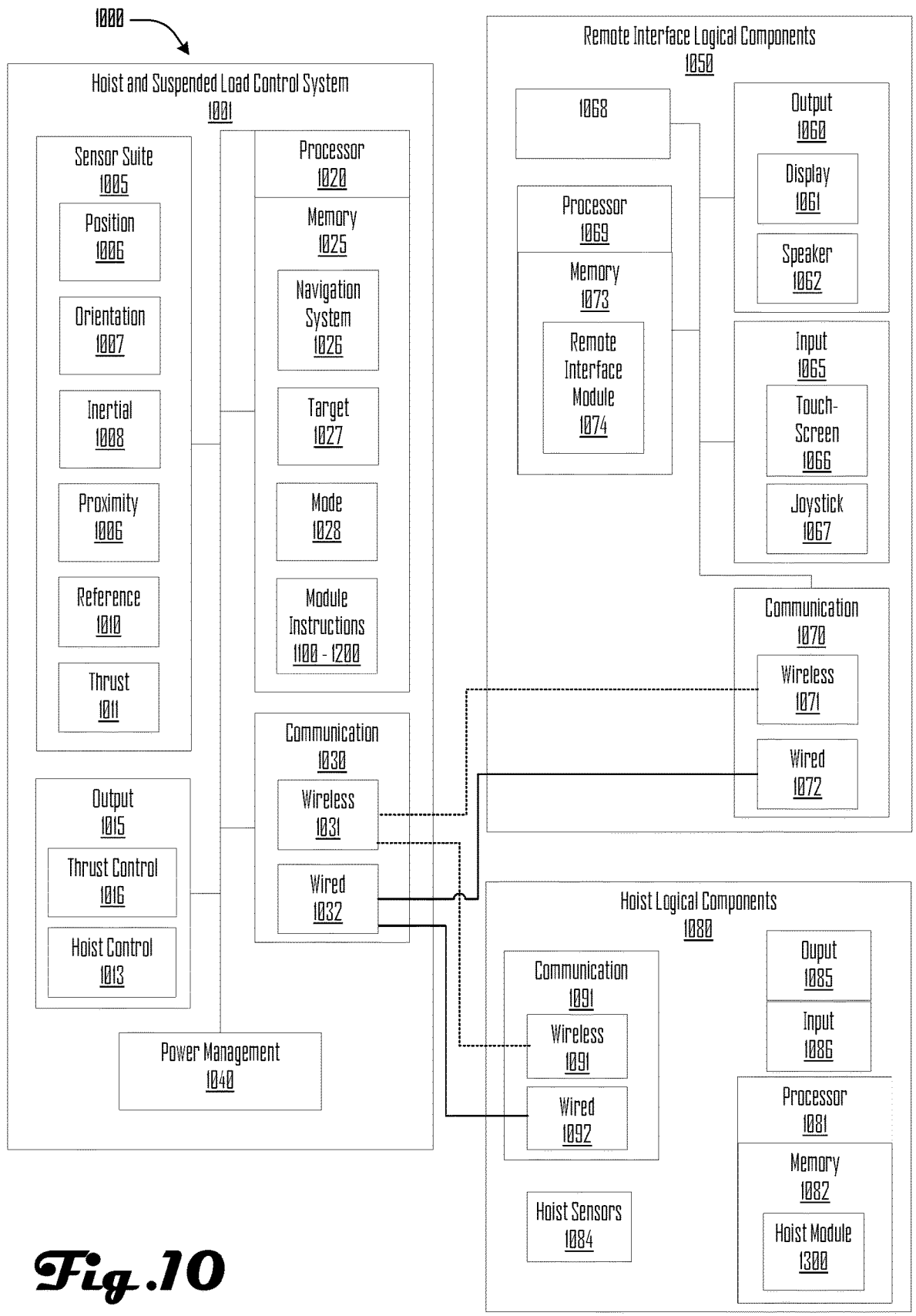
FIG. 10 schematically illustrates operational components of a hoist and deployable equipment control system including remote interface logical components and hoist logical components, in accordance with an embodiment.

FIG. 10 illustrates hoist and deployable equipment logical system 1001 remote interface logical components 1050, and hoist logical components 1080.

As illustrated in the embodiment in FIG. 10, within hoist and deployable equipment logical system 1001 may be sensor suite 1005, deployable equipment processor 1020, deployable equipment memory 1025, deployable equipment communication system 1030, deployable equipment output 1015, and power management 1040.

Sensor suite 1005 may comprise position sensors 1006, orientation sensors 1007, inertial sensors 1008, proximity sensors 1009, reference location sensors 1010, and thrust sensors 1011.

Deployable equipment processor 1020, may be one or more processor, microcontrollers, and or central processing units (CPUs). In some embodiments, processors and microcontrollers may be mounted to the same printed circuit board (PCB).

Deployable equipment memory 1025 may generally comprise a random access memory ("RAM"), a read only memory ("ROM"), and a permanent non-transitory mass storage device, such as a disk drive or SDRAM (synchronous dynamic random-access memory).

Deployable equipment memory 1025 may store program code for modules and/or software routines, such as, for example, navigation system 1026, deployable equipment operational module 1100, and hoist and deployable equipment data fusion and control module 1200, as well as data or information used by modules and/or software routines, such as, for example, target data 1027, and mode or command state information 1028.

Deployable equipment memory 1025 may also store an operating system. These software components may be loaded from a non-transient computer readable storage medium into deployable equipment memory 1025 using a drive mechanism associated with a non-transient computer readable storage medium, such as a floppy disc, tape, DVD/CD-ROM drive, memory card, or other like storage medium. In some embodiments, software components may also or instead be loaded via a mechanism other than a drive mechanism and computer readable storage medium (e.g., via a network interface.

Deployable equipment memory 1025 may also comprise a kernel, kernel space, user space, user protected address space, and a datastore. As noted, deployable equipment memory 1025 may store one or more process or modules (i.e., executing software application(s)). Processes may be stored in user space. A process may include one or more other process. One or more process may execute generally in parallel, i.e., as a plurality of processes and/or a plurality of threads.

The kernel may be configured to provide an interface between user processes and circuitry associated with processor 1020. In other words, the kernel may be configured to manage access to processor 1020, a chipset, I/O ports and peripheral devices by processes. The kernel may include one or more drivers configured to manage and/or communicate with elements of operational components of deployable equipment (i.e., processor 1020, chipsets, I/O ports, and peripheral devices).

Deployable equipment processor 1020 may also comprise or communicate via a bus and/or a network interface with deployable equipment memory 1025 or another datastore.

The data groups used by modules or routines in deployable equipment memory 1025 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Deployable equipment communication system(s) 1030 may include wireless system(s) 1031 such as a wireless transceiver, and wired system(s) 1032. Deployable equipment output 1015 includes thrust control 1016 via thruster controllers. Deployable equipment output 1015 includes hoist control 1013, to control a hoist. Power managing systems 1040 regulate and distribute the power supply from, e.g., batteries. One or more data connectors, data buses, and/or network interfaces may connect the various internal systems and logical components of the deployable equipment.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), the Internet, or any radio frequency communication technology. Data from deployable equipment may be of very low bandwidth and may not be restricted to a frequency or communication protocol. In a distributed computing environment, modules can be located in both local and remote memory storage devices.

Hoist and deployable equipment logical system 1001 may work with a remote positional unit, remote interface, or target node ("remote interface unit") and logical components thereof, such as remote interface logical components 1050, and or with a hoist and hoist logical components, such as hoist logical components 1080, in accordance with one embodiment.

In embodiments, the remote interface unit may, for example, be held by an operator or attached to a carrier by magnets, bolts, or any other attachment mechanism. In embodiment, the remote interface unit may be dropped at a location on the ground or attached to, e.g., a life preserver or other flotational device, a rescuer, a load to be picked up, a location for a load to be delivered, or an operational specific location.

In embodiments, the remote interface logical components 1050 may convey input from an operator to hoist and deployable equipment logical system 1001, such as command states and operational instructions to hoist and deployable equipment operational module 1100. In embodiments, remote interface logical components 1050 may convey information or data from hoist logical components 1080 to hoist and deployable equipment logical system 1001 and or to an operator, such as a status of the hoist, a length of suspension cable payed out, a force or mass on the hoist from the suspension cable, and the like.

Remote interface logical components 1050 may be in communication with hoist and deployable equipment logical system 1001 and or with hoist logical components 1080 via communication systems 1070, which may be wireless 1071 or wired 1072. Output 1060 from remote interface 1050 may include information displayed on a screen 1061, and audio 1062. Input 1065 to remote interface 1050 to control the deployable equipment or hoist may include commands conveyed through touchscreen 1066, a joystick 1067, a microphone, a camera, one or more buttons, or the like. In various embodiments, remote interface 1050 may comprise one or more physical and/or logical devices that collectively provide the functions described herein. An example of an embodiment of remote interface 1050 is illustrated and discussed in FIG. 14A, FIG. 14B, FIG. 15A, FIG. 15B, and FIG. 15C.

Remote interface logical components 1050 may further comprise processor 1069 and memory 1073, which may be similar to processor 1020 and memory 1025. Memory 1073 may comprise software or firmware code, instructions, or logic for one or more modules used by the remote positional unit, such as remote interface module 1074. For example, remote interface module 1074 may provide control and interface for a remote interface, such as to allow it to be turned on/off, to pair it with deployable equipment, to input instructions, or the like.

In embodiments, remote interface logical components 1050 may comprise a sensor suite or beacon configured to communicate, such as wirelessly, with hoist and deployable equipment logical system 1001 to provide, for example, a position reference. If the deployable equipment and hoist is considered a primary sensor suite, a secondary sensor suite location can be the platform or carrier from which the cable is suspended, and a tertiary sensor suite location can be a location of interest for the load (e.g., for positioning to obtain or deliver the load).

Also illustrated in FIG. 10 are hoist logical components 1080. Hoist logical components 1080 may comprise processor 1081 and memory 1082, which may be similar to processor 1020 and memory 1025. Memory 1082 may comprise software or firmware code, instructions, or logic for one or more modules used by a hoist, such as hoist with integrated deployable equipment operational module 1300. For example, hoist with integrated deployable equipment operational module 1300 may pair a hoist with deployable equipment, may output sensor data of the hoist to deployable equipment, and may receive and act on local and remote instructions, such as to deploy or stow deployable equipment, or the like.

Hoist logical components 1080 may be in communication with hoist and deployable equipment logical system 1001 via communication system 1091, which may comprise wireless 1091 or wired 1092 transceivers. Output 1085 from hoist logical components 1080 may include information or data from, for example, hoist sensors 1084, such as, for example, a cable length encoder, a reel torque encoder, a cable presence sensor (to sense the presence of a suspension cable in a hoist), stain gauges, equipment temperature sensors, power sensors, and the like. Input 1086 to hoist logical components 1080 to control the hoist may include commands from hoist and deployable equipment logical system 1001 and modules, thereof, such as deployable equipment operational module 1100 and hoist and deployable equipment data fusion and control module 1200. Input 1086 to hoist logical components 1080 to control the hoist may also include commands from human operators, which commands may be conveyed through, for example, remote interface logical components 1050, such as touchscreen 1066, a joystick 1067, a microphone, a camera, one or more buttons, or the like.

Figure 11:
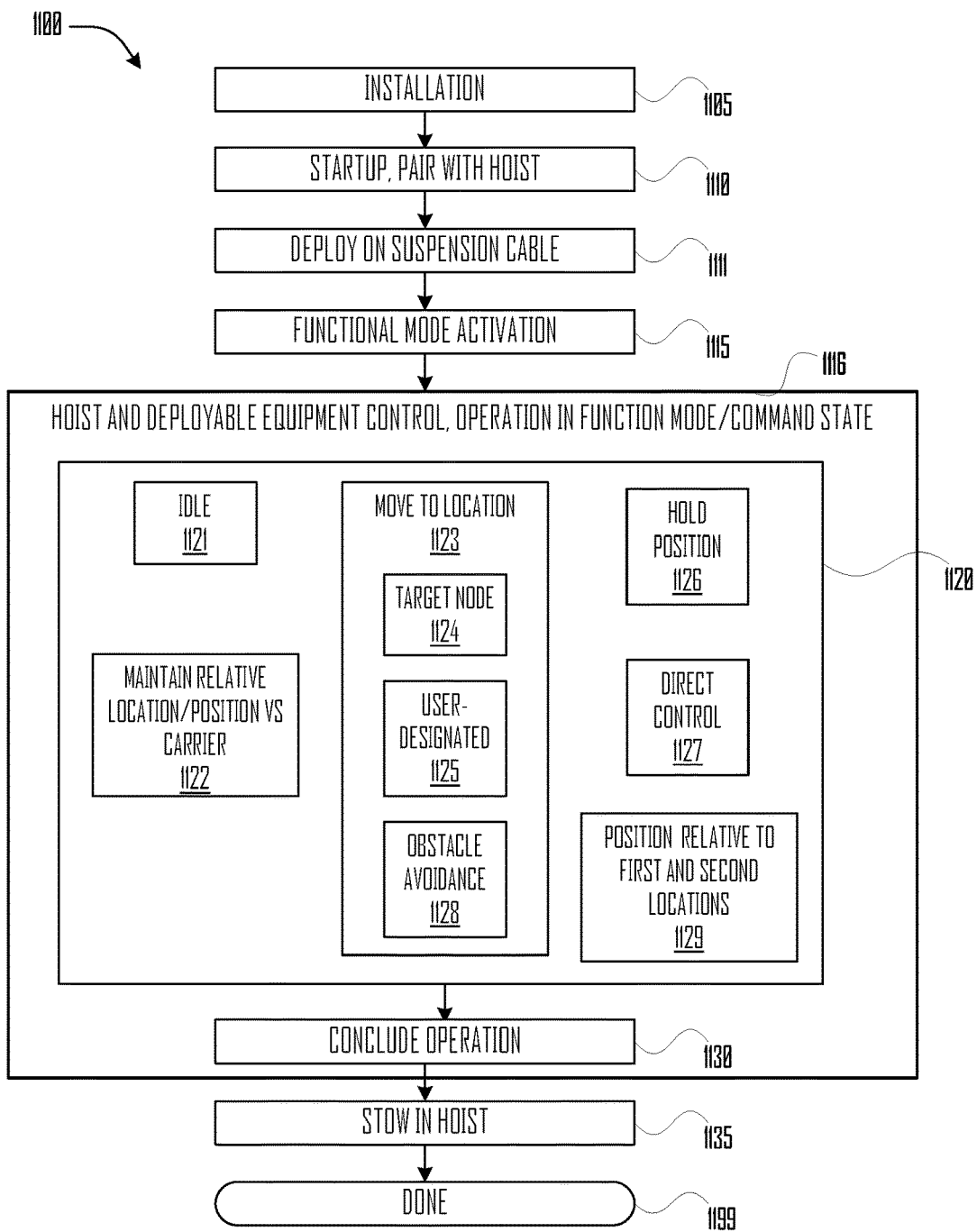
FIG. 11 illustrates an operational module of a deployable equipment system including multiple modes or command states in accordance with an embodiment.

FIG. 11 illustrates deployable equipment operational module 1100 of a deployable equipment, including multiple modes or command states in accordance with one embodiment. Instructions of, or which embody, deployable equipment operational module 1100 may be stored in, for example, deployable equipment memory 1025, and may be executed or performed by, for example, deployable equipment processor 1020, as well as by electrical circuits, firmware, and other computer and logical hardware of deployable equipment with which deployable equipment operational module 1100 may interact.

In block 1105, the deployable equipment may be installed into a hoist and or onto a suspension cable. When installed into a hoist, referring to FIG. 16A and FIG. 16B, locking member 1605 may engage with deployable equipment projection 1615 or, said another way, a first interlocking shape engages with a second interlocking shape with a structure which allows one degree of freedom of motion between them. A locking member 1605 may block the one degree of freedom of motion, to lock the first interlocking shape and the second interlocking shape together.

Figure 17A:
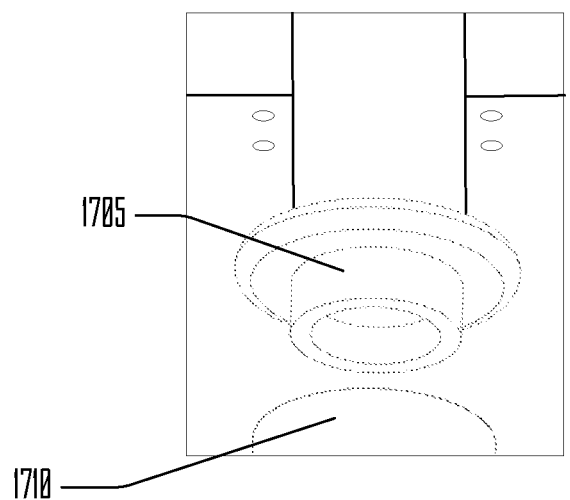
FIG. 17A illustrates a coupling to a terminal equipment of a suspension cable, in accordance with an embodiment.
Figure 17B:
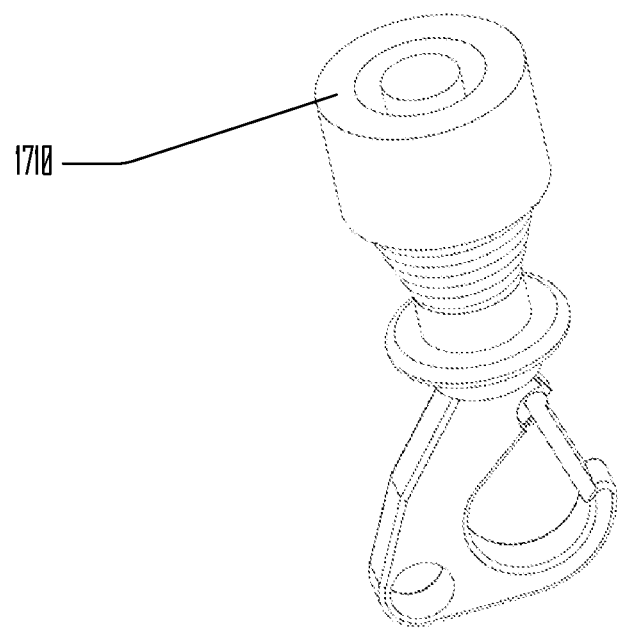
FIG. 17B illustrates a deployable equipment seat of a terminal equipment of a suspension cable, in accordance with an embodiment.

When installed into a hoist, a suspension cable may be inserted into a suspension cable channel in deployable equipment. When inserted into the suspension cable channel, the suspension cable may pass freely through the open suspension cable channel. Referring to FIG. 17A and FIG. 17B, when deployed onto a suspension cable, flange 1705, for example, may be engaged with or to a deployable equipment seat of a terminal equipment of a suspension cable 1710.

In block 1110, the deployable equipment may be started up and deployable equipment operational module 1100 activated. In some embodiments, deployable equipment operational module 1100 may be activated by a hoist or a hoist operational module. In some embodiments, deployable equipment operational module 1100 may be initialized by the press of a button located on the deployable equipment. Near the button which may initialize the system, another button may cause immediate system shut down when pressed. The system may also be initialized by an operator or process not directly next to the system, e.g. remotely. One or more external operators or processes, including but not limited to a rescuer on the end of the cable, may initialize the system by pressing a button on one or more remote interface 1050 linked wirelessly to the deployable equipment.

In embodiments, installment may be aided or managed by deployable equipment operational module 1100. For example, deployable equipment operational module 1100 may be instructed to or may open a channel for the suspension cable in the deployable equipment. For example, deployable equipment operational module 1100 may sense the presence of a suspension cable within the channel, such as with hoist sensors 1084. For example, deployable equipment operational module 1100 may or may be instructed to close the channel for the suspension cable, such as through the activation of fingers, such as fingers 915. For example, deployable equipment operational module 1100 may or may be instructed to clamp itself to the suspension cable, such as through fingers 915 or another clamp.

In block 1115, deployable equipment operational module 1100 is active and receives one or more functional modes or command states selected by an operator or a process and proceeds to block 1116, within which deployable equipment operational module 1100 executes the functional mode or command state, which may include calling and performance of hoist and deployable equipment data fusion and control module 1200 as a subroutine or submodule, to implement the functional mode or command state and to conclude the functional mode or command.

In block 1120 and a functional mode or command state, deployable equipment operational module 1100 may perform or call hoist and deployable equipment data fusion and control module 1200 as a subroutine or submodule, to implement a functional mode or command state.

The functional modes or command states of the system are:

Idle mode 1121: all internal systems of the deployable equipment are operating (e.g., deployable equipment module observes its motion and calculates control or other actions), but the thrusters and hoist are shut off, maintain an idle speed only, or maintain a hoist at a then-current cable extension, without action to affect the motion of the load.

Maintain relative position vs. carrier mode 1122: The deployable equipment module activates thrusters or hoist to stabilize the deployable equipment with respect to a a carrier or slung origin point below the carrier. For example, when the deployable equipment is suspended with a load below a helicopter, the deployable equipment module may activate thrusters and hoist to cause the deployable equipment to stay directly below the helicopter, at a location with lowest potential energy. For example, when the deployable equipment is suspended below a fixed-wing aircraft, the deployable equipment module may activate thrusters and hoist to stay at an elevation relative to the carrier, such as to counteract "yo-yo" effect, and to stay at a center of an orbit of the carrier. The deployable equipment module localizes the carrier motion, determines elastic or other behavior of the suspension cable, and performs corrective actions with thrusters and hoist necessary to damp any other motion of the deployable equipment and load. If the carrier is traveling at a low speed, the deployable equipment module will couple velocity of the deployable equipment with the carrier using the thrusters and hoist so the two entities move in unison. Upon a disturbance to the load or motion of the deployable equipment, the deployable equipment module provides thrust or activates the hoist opposite the direction of the disturbance to counteract the disturbance, eliminating swing, "yo-yo" effects caused be elasticity of the suspension cable or spirals in the suspension cable (which may be caused by the carrier orbiting the load), or other undesired motion.

Move to/stop at position mode 1123: The deployable equipment module will stabilize the deployable equipment to a fixed position, counteracting influence of the weather, small movements of the carrier, or changes in the elevation of the deployable equipment relative to the carrier. This mode has the effect of negating all motion. In this mode, an operator or another process can send the desired target position to the deployable equipment via remote interface logical components 1050. This can be accomplished in at least the following ways:

Target node position 1124: The operator can place a remote positional unit, remote interface, or target at the desired drop off or pickup location. The remote positional unit will communicate wirelessly with the deployable equipment module to indicate the desired position, and the deployable equipment module responds by activating thrusters and hoist to maneuver to the desired location. This mode may further hold a desired tension on the suspension cable. The remote interface logical components 1050 may receive and display location information of entities.

User-designated position 1125: An operator or process can use the remote interface logical components 1050 to send a designated location (e.g., latitude and longitude coordinates, selection of a location on a map or in an image, etc.) to the deployable equipment module. The deployable equipment module will then, if already at the location, use the thrusters and or hoist to hold the deployable equipment and suspended load at the designated location or steadily direct the deployable equipment and suspended load to the desired location. This mode may further hold a desired tension on the suspension cable. The deployable equipment module may simultaneously send information or data to the remote interface logical components 1050 regarding, for example, position, distance, elevation, and suspension cable tension information for display or communication to an operator, process, or others.

Hold position mode 1126: The deployable equipment module will resist all motion and maintain attempt to maintain a current location of the deployable equipment independent of the carrier's motion, using thrusters and hoist. This mode has the effect of dampening all motion of the deployable equipment. This mode has conditional responses relative respectively to carrier speed, safety factors, and physical constraints.

Direct control mode 1127: Joystick or other direct operation of the thrusters and hoist in three degrees of freedom (e.g. in x-, y-, and z-axis) as well as rotation. Though the deployable equipment module may be entirely closed-loop and may not require external control during operation, there is an option for direct user control of the thrusters and hoist. An operator is able to directly control position, rotation, thruster output level, suspension cable length, or suspension cable tension.

Obstacle avoidance 1128: the deployable equipment module identifies a path of the deployable equipment and load, identifies objects in the path, determines position, rotation, thruster output level, and suspension cable length which may avoid the obstacle, and outputs instructions to thrusters and or hoist to avoid the obstacle. For example, obstacle avoidance module 1128 module may receive and process sensor information such as to i) to equalize the distance between sensor locations, such as at fan units and objects, such as obstacles, sensed in the environment or ii) to measure or receive geometry of a load, measure geometry of obstacles sensed in the environment, determine or receive the position, orientation, and motion of the load, and negotiate the load relative to the obstacle Position relative to first and second locations mode 1129: An operator or process can use, for example, use remote interface logical components 1050 to designate a first position (e.g., pickup or drop off location) to the deployable equipment module; the operator or process may further designate a second location, such as a location of a carrier, a location on the ground, etc., and may also designate a desired a rate of change between the first and second locations. The deployable equipment module activates thrusters and hoist to stabilize the deployable equipment relative to the first location and then activates thrusters and hoist to move the deployable equipment from the first location to the second location. The rate of change may be based on percentage of a maximum rate of change the deployable equipment operational module can achieve, whether designated by an operator or otherwise. This mode may further hold a desired tension on the suspension cable.

In block 1130, an operator or process may complete the functional mode or command state, such as by obtaining a desired location, such as by a command from the operator or process, such as by loss of power, or the like.

In block 1135, deployable equipment module may activate the hoist to bring the deployable equipment up to the hoist and may activate thrusters to rotate the deployable equipment to a position compatible with being stowed in the hoist. The deployable equipment module may detect when the deployable equipment is in the hoist, detect engagement of interlocking structures of the hoist and deployable equipment, such as structures illustrated in FIGS. 16A and 16B, and detect engagement of locking structures and locking together of interlocking structures. The deployable equipment module may detect engagement of the deployable equipment with an interface for the deployable equipment of the hoist and may activate communication, power, and other services of the interface for the deployable equipment. If the deployable equipment includes collapsible arms or other components, they may be folded. Thrusters and other components may be powered down. Cable retention components, such as clamps or fingers, may be released. The deployable equipment may be disengaged from terminal equipment of the suspension cable and or from the suspension cable. A load may be detached from a load hook. The suspension cable may detached from a hoist ring at a top of the deployable equipment. A stow cable or other securement may be secured to the deployable equipment. The deployable equipment may be stowed in a charger or other location.

At done block 1199, if not performed at block 1135, deployable equipment operational module 1100 may be shut down, such as by activation of a button or other control on the deployable equipment, on an interactive display, or on remote interface of the deployable equipment.

Figure 12:
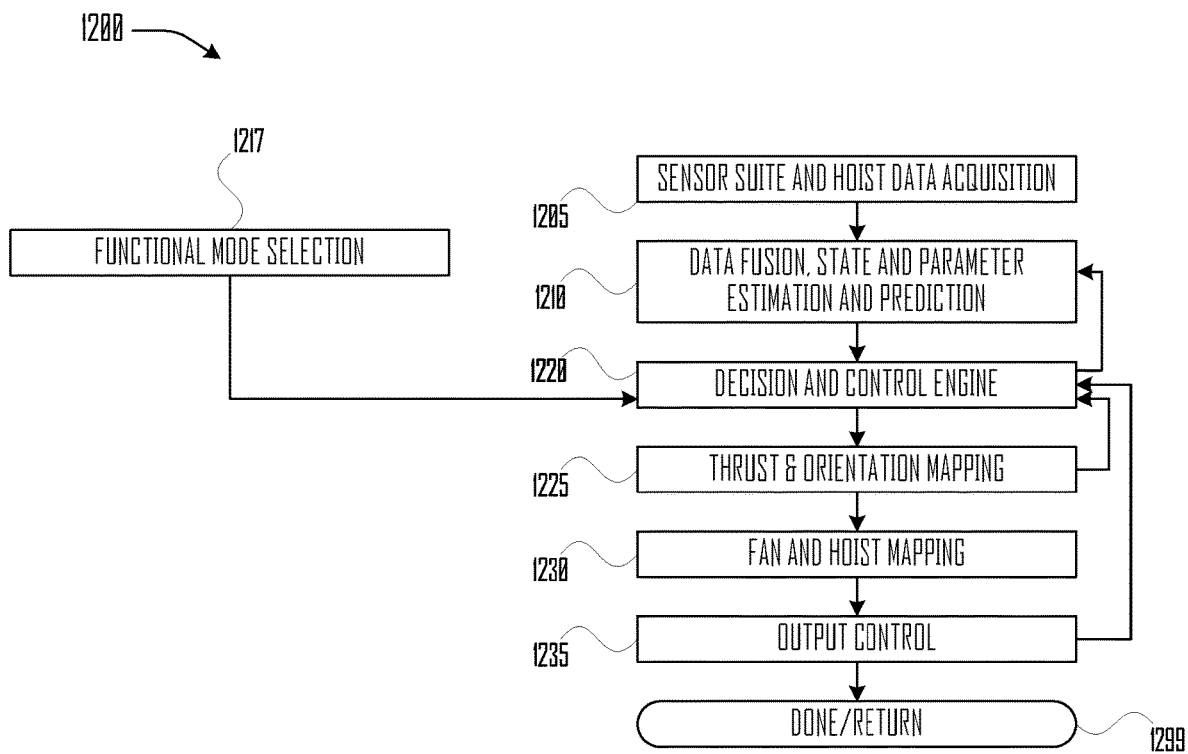
FIG. 12 illustrates hoist and deployable equipment data fusion and control module of a deployable equipment control system in accordance with an embodiment.

FIG. 12 illustrates hoist and deployable equipment data fusion and control module 1200 of a deployable equipment, in accordance with one embodiment. Instructions of, or which embody, hoist and deployable equipment data fusion and control module 1200 may be stored in, for example, deployable equipment memory 1025, and may be executed or performed by, for example, deployable equipment processor 1020, including by electrical circuits, firmware, and other computer and logical hardware of deployable equipment, hoist logical components 1080, and remote interface logical components 1050 with which hoist and deployable equipment data fusion and control module 1200 may interact.

Hoist and deployable equipment data fusion and control module 1200 may operate in a closed iterative loop to understand its position and motion in near real time, perform a set of calculations to determine the most desired system response, and send desired response(s) to the air propulsion system thruster array and to the hoist to mitigate swing of the cable during operations and to control the z-axis of deployable equipment and load. This process may be continuous while the system has power.

At block 1205, hoist and deployable equipment data fusion and control module 1200 may perform data acquisition with a sensors including (but not limited to) cameras, accelerometers, gyroscopes, magnetometer, inclinometer, directional encoder, radio frequency relative bearing system, gravitational sensors, microelectromechanical systems (MEMS) sensors, Global Positioning System (GPS), lidar/radar, machine vision, range finders, ultrasonic proximity sensors (e.g. sensors of sensor suite 1005), and with sensor data or information from the hoist. For example, a hoist may provide information or data regarding a length of suspension cable, a tension or torque on the hoist or reel therein, a mass on the hoist or reel therein, or the like. This raw data or information, however, may be subject to noise, out-of-range values, and other errors and uncertainty. At block 1205, hoist and deployable equipment data fusion and control module 1200 may further filter the acquired data or information for out-of-range values, frequency oscillations, and the like.

At block 1210, the hoist and deployable equipment data fusion and control module 1200 combines data or information from the sensors and hoist of block 1205 with a previous state of the system model determined at a previous iteration of block 1210 in a system model, also described as a data fusion or as an online parameter estimation and an online state estimation. Block 1210 determines a deviation from the currently measured state or parameter and the previously predicted state or parameter. This block estimates current parameters of the system based on the data or information of block 1205 and predicts near-term future parameters of the system, such as, for example, mass or weight, length of cable below a carrier or distance below the carrier, and moment of inertia of the deployable equipment (and load). This block estimates current state of the system based on the data or information of block 1205 and predicts near-term future state of the system, such as, for example, position (including elevation), orientation, motion, environmental disturbances or influences and the like. This block compares the current state or parameter to a previously predicted state or parameter and determines a deviation between the current state or parameter and the predicted state or parameter. Sensor data may be processed by a system model using, for example, non-linear flavors of, for example, a Kalman Filter to predict the near-term future state and parameters of the system and to estimate the current state and parameters of the system. Closed-loop, iterative control methods performed in this block may include fuzzy-tuned proportional, integral, and derivative feedback controllers which have bidirectional communication with advanced control methods including deep learning neural nets and future propagated Kalman filters, allowing for real-time (or "online") system identification. Block 1210 may be able to estimate current or predict near-term elements of the state or of the parameters, such as distance below a carrier, mass of the deployable equipment and load, position, and movement without data or information from hoist. However, with data or information from hoist, the state and parameter estimation and prediction may be improved.

At block 1217, hoist and deployable equipment data fusion and control module 1200 receives a user, process, or operator selected functional mode or command state; e.g. from block 1116 of deployable equipment operational module 1100. This may comprise coordinates, elevation, desired rates, etc.

At block 1220, hoist and deployable equipment data fusion and control module 1200 takes state and parameter estimation and state and parameter prediction 1210 and the deviation between the current state and parameters and the previously predicted state and parameters, informed by the user-selected or process-selected functional mode or command state 1217, as well as additional feedback from the thrust and orientation mapping 1225 and output control 1235, and decides how the deployable equipment should move to achieve the functional mode or command state input at block 1217, such as by outputting force from thrusters or hoist.

Algorithmic output is sent to motion controllers from which the desired thrust response will be sent to the electric duct fans via phase control and or to the hoist for output to a reel motor. The net thrust output is mapped in real-time through encoders and load cells then sent back to the hoist and controllers for closed-loop control.

At block 1230, hoist and deployable equipment data fusion and control module 1200 maps how the deployable equipment should move to fans, potential fan, the hoist and potential hoist output to generate a fan and hoist mapping to control the thrusters and hoist to achieve the determined thrust, orientation, and elevation of the deployable equipment.

At block 1235, hoist and deployable equipment data fusion and control module 1200 applies the fan and hoist mapping to output control signals to the fans or thrusters or to the hoist (or electronic components controlling or controlled by the same) to achieve the determined thrust and orientation of the deployable equipment, exerting commanded control output and implementing a dynamic response in the form of thrust from the fans, and reeling in or paying out of the suspension cable by the hoist.

At done block 1299, hoist and deployable equipment data fusion and control module 1200 may conclude or return to a module which may have called it.

FIG. 13 illustrates hoist with integrated deployable equipment operational module 1300, in accordance with one embodiment. Instructions of, or which embody, hoist with integrated deployable equipment operational module 1300 may be stored in, for example, hoist memory 1082, and may be executed or performed by, for example, hoist processor 1081, as well as by electrical circuits, firmware, and other computer and logical hardware of hoist, hoist logical components 1080, and remote interface logical components 1050 with which hoist and deployable equipment data fusion and control module 1200 may interact.

At block 1305, hoist with integrated deployable equipment operational module 1300 may obtain information or data from sensors of a hoist, such as hoist sensors 1084.

At block 1310, hoist with integrated deployable equipment operational module 1300 may pair itself and its hoist and or with a remote device or process. Pairing may require authentication and authorization in one or both devices or processes.

At block 1315 hoist with integrated deployable equipment operational module 1300 may output hoist sensor data or information to the paired remote device or process.

At decision block 1320 may determine whether it is to act on local or remote instructions. For example, hoist with integrated deployable equipment operational module 1300 may act on remote instructions unless local instructions are received, in which case a local over-ride may be activated.

If negative or equivalent at decision block 1320, hoist with integrated deployable equipment operational module 1300 may proceed to opening loop block 1325. Hoist with integrated deployable equipment operational module 1300 may iterate over opening loop block 1325 to closing loop block 1340.

At block 1330, hoist with integrated deployable equipment operational module 1300 may receive a remote instruction, such as an instruction from deployable equipment operational module 1100, from a remote interface, or the like. The instruction may be, for example, an instruction to pay out suspension cable, reel in suspension cable, or maintain a tension or other force on the suspension cable. The instruction may be to pay out or reel in a specified amount of cable to or pay out or reel in until another instruction is received to stop. The instruction may specific a rate at which the reel is to be operated and or a maximum or minimum tension or other force to be achieved by the reel. Hoist with integrated deployable equipment operational module 1300 may determine a minimum or maximum tension, rate, or force. The instruction may be to activate actuators of the hoist, such as actuators to deploy a deployable equipment from the hoist or to secure the deployable equipment to the hoist.

At block 1335, hoist with integrated deployable equipment operational module 1300 may output control to implement the remote instruction, such as to pay out suspension cable, reel in suspension cable, or maintain the tension or other force on the suspension cable, or the like.

At block 1345, which may follow an affirmative or equivalent decision at decision block 1320, hoist with integrated deployable equipment operational module 1300 may receive a local instruction, such as an instruction from a crew of a carrier or an interface of the hoist which is given a higher priority than an instruction from another source. The instruction may be, for example, an instruction to pay out suspension cable, reel in suspension cable, or maintain a tension or other force on the suspension cable. The instruction may be to pay out or reel in a specified amount of cable to or pay out or reel in until another instruction is received to stop. The instruction may specific a rate at which the reel is to be operated and or a maximum or minimum tension or other force to be achieved by the reel. Hoist with integrated deployable equipment operational module 1300 may determine a minimum or maximum tension, rate, or force. The instruction may be to activate actuators of the hoist, such as actuators to deploy a deployable equipment from the hoist or to secure the deployable equipment to the hoist.

At done block 1299, hoist with integrated deployable equipment operational module 1300 may conclude, may shut down the hoist, and or may return to a process which may have called it.

Figure 14A:
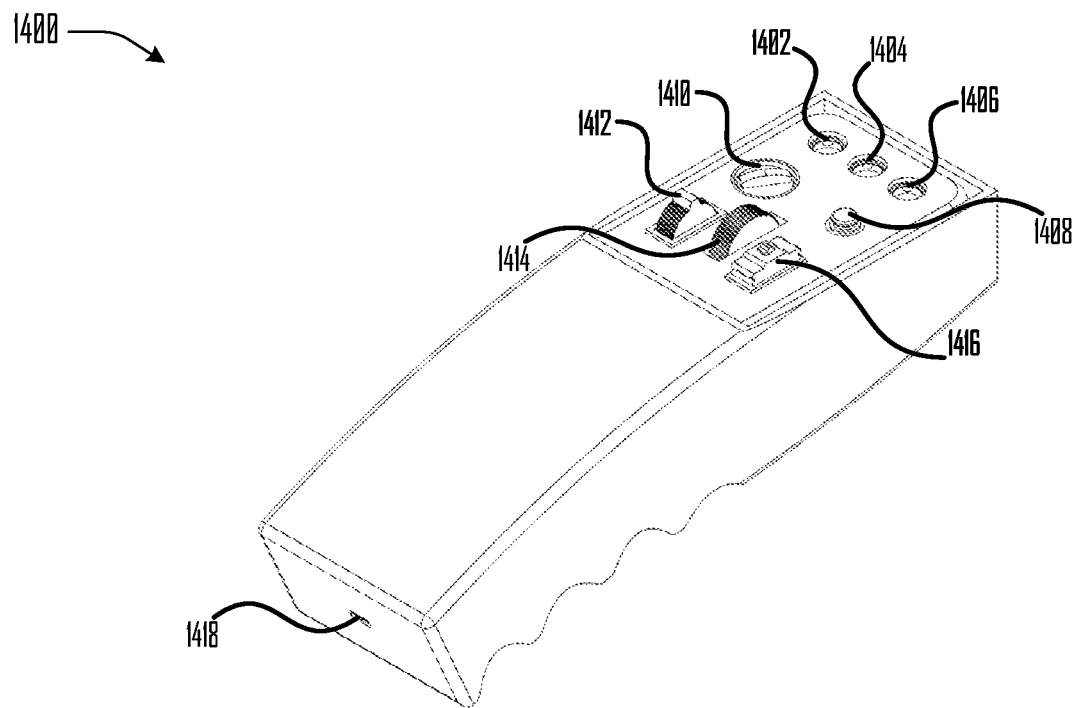
FIG. 14A illustrates a view of a remote interface for an integrated hoist and deployable equipment, in accordance with an embodiment.
Figure 14B:
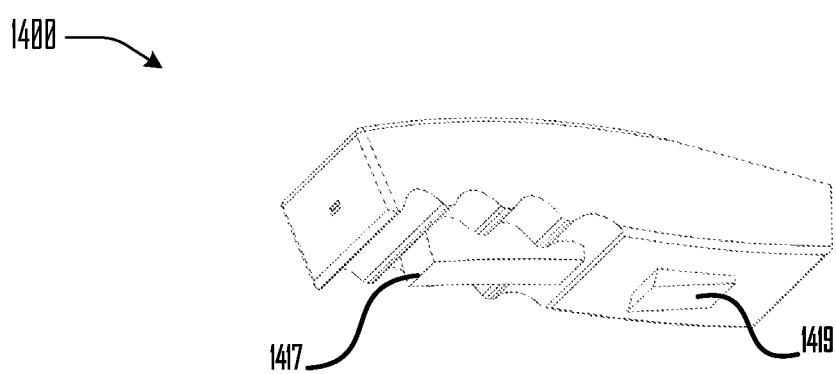
FIG. 14B illustrates a second view of the remote interface for the integrated hoist and deployable equipment of FIG. 14A, in accordance with an embodiment.

FIG. 14A illustrates a first view of a remote interface 1400 for a hoist and deployable equipment, in accordance with an embodiment. FIG. 14B illustrates a second view of the remote interface 1400 of FIG. 14A, in accordance with an embodiment. Remote interface 1400 may allow control of or communication with a deployable equipment and or hoist. Specific types of control means are discussed in the examples below, but the function and/or types of control devices should not be limited thereto. For example, a switch may be interchangeable with a button or a lever. The button may be a mechanically operated button or may be a virtually button. The control devices in the examples below may be interchanged with alternative devices by one of skill the art without undue experimentation or burden. In an embodiment, the remote interface 14000 may be a pendant type hand-operated controller configured to control the operation of a deployable equipment and or hoist.

The types of controls available may be any that are necessary to operate the deployable equipment and hoist, attached mechanical systems, and/or a payload before or after attachment to the suspension cable and or hoist. In some embodiments, a non-limiting set of controls may comprise caution light 1402, over-temperature warning light 1404, deployment status light 1406, deployment button 1408, boom toggle switch 1410, rotary control switch 1412, hoist vertical control 1414, state selector switch 1416 and data and power port 1418.

As non-limiting examples, caution light 1402 may provide a configurable alert for potentially hazardous conditions. Over-temperature warning light 1404 may provide a configurable alert indicating that a mechanical system is experiencing an over-temperature condition. Deployment status light 1406 may shine green when a deployable equipment is deployed, may flash green when the deployable equipment is in position to be stowed, or provide other, similar indications of mechanical system status. Deployment button 1408, when pressed, may begin a deployment process, such as in hoist with integrated deployable equipment module 1300. Deployment button 1408 may stay depressed after being initially pressed to indicate that the deployable equipment has been deployed. If pressed again, it may return to its undepressed position to indicate that the deployable equipment has been stowed. If a boom or arm attaches the hoist or hoist housing to the carrier, boom toggle switch 1410 may move the boom from a storage position to an active deployment position. Rotary control switch 1412 may allow direct control of a deployable equipment orientation. This control may be dependent on depression of a controller live trigger. Hoist vertical control 1414 may raise or lower the hoist cable, controlling the up/down motion of the hoist payload.

In an embodiment, state selector switch 1416 may control the state or functional mode of a deployable equipment. For example, the position of the switch may be used to select whether the deployable equipment is in a "stabilize" state, where its fans are used to provide a rotational or lateral impetus to counteract load motion and stabilize the mode. The switch in another position may be used to put the mechanical system in an "idle" state, wherein the deployable equipment is deployed on a suspension cable but does not take any additional action.

In an embodiment, data and power port 1418 may be a USB or equivalent connection port. Connection to this port may provide a path for the controller electronics to interface with any other systems necessary to operate or monitor the hoist integration system and/or attached payloads. As a non-limiting example, the port may receive power and communicate with a remote interface. Remote interface 1400 may have a wired or wireless data connection to hoist logical components and to deployable equipment logical components. The logic for remote interface 1400 may in some embodiments be contained within remote interface 1400, which may still receive power from a proximal power system by means of power port 1418.

As illustrated in FIG. 14B, controls provided on the bottom side of remote interface 1400 may comprise controller live trigger 1417 and a configurable second trigger 1419. Controller live trigger 1417 may be used as a safety mechanism, allowing certain control unit actions only when controller live trigger 1417 is depressed. For example, a rotary control switch may only be operable with it is activated concurrent with pressure on controller live trigger 1417. Configurable second trigger 1419 may be provided to allow additional functionality or safeguards to be implemented for a specific deployable system.

Figures 15A, 15B, 15C:
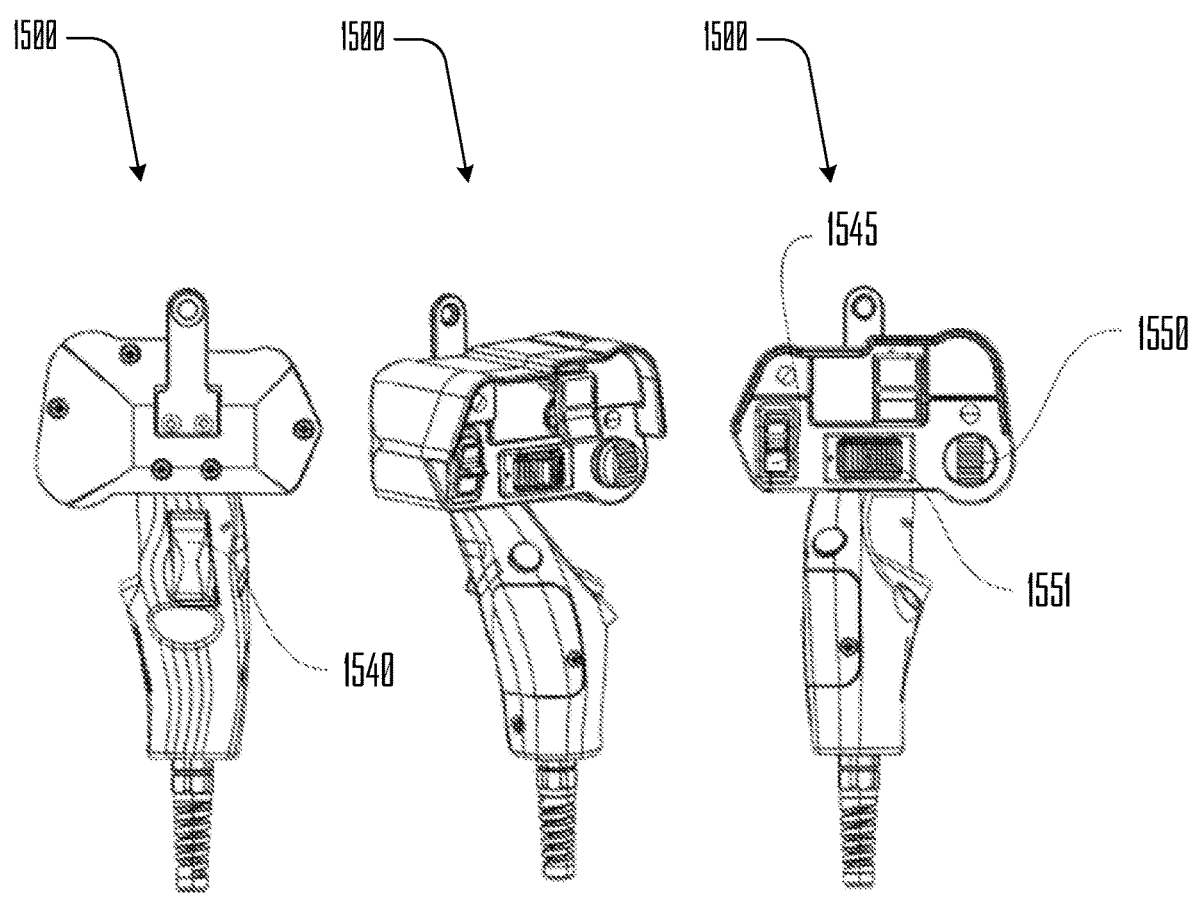
FIG. 15A illustrates back view a remote interface of an SLCS, in accordance with an embodiment.
FIG. 15C illustrates a front view of a remote interface of an SLCS, in accordance with an embodiment.

FIG. 15A illustrates back view of remote pendant or remote interface 1500 of a deployable equipment, in accordance with an embodiment. FIG. 15B illustrates an oblique view of remote interface 1500 of a deployable equipment, in accordance with an embodiment. FIG. 15C illustrates a front view of remote interface 1500 of a deployable equipment, in accordance with an embodiment. These figures illustrate, for example, activation controller 1540, on/off switch 1545, state selector 1550, and manual/rotational control 1551. On/off switch 1545 may be used to turn remote pendant 1500 on or off. State selector 1550 may be used to select a command state of a deployable equipment operational module 1100, as may be discussed in relation to FIG. 11. Activation controller 1540 may be used to activate or deactivate operational module 1100 in or relative to a command state selected or indicated by state selector 1550. Manual/rotational control 1551 may be used to manually activate fans to rotate or translate a load or to raise or lower a hoist when state selector 1550 has been used to select, for example, direct control mode 1127.

In this manner, a cable attachment mechanism of a deployable equipment may bear the mass of deployable equipment on a core of cable attachment mechanism, wherein the core may be coupled to terminal equipment of the suspension cable, and wherein the terminal equipment may transfer rotational force to suspension cable. Though bearing the mass of deployable equipment on the terminal equipment, bearings of the core allow deployable equipment to rotate, without transferring force, or significant force, such as torque, to the suspension cable.

Thereby, deployable equipment may be attached to a load, such as by straps or cables and may be able to rotate the load or rotate with the load on the suspension cable. A rotary bearing or coupling between the hook and the suspension cable may thereby allow the load, terminal equipment, e.g. bumper and hook, and deployable equipment to rotate separately from cable. For example, when the deployable equipment is an SLCS, the SLCS may be able to control a load, such as a litter, though the load may be subject to rotation or may be rotated by the SLCS, without transfer of a rotational force to suspension cable.

Thereby, deployable equipment may be retained within hoist, carrier, or proximate to carrier, and deployed on suspension cable, with minimal human or crew effort and by or with involvement of deployable equipment module.

Thereby, deployable equipment, deployable equipment module, and hoist module may control a hoist, such as a reel of a hoist, to control a z-axis of a terminal end of suspension cable.

Control of the z-axis may be, for example, to control an elevation of a load, such as relative to carrier, ground, or an objective or target. Control of the z-axis may be, for example, to control a tension on or of suspension cable. Control of the z-axis may be, for example, to control a rate of ascent or descent of a terminal end of suspension cable.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a helicopter, crane, or fixed wing carrier, though other carriers may be used. This application is intended to cover any adaptations or variations of the embodiments discussed herein.

Following are non-limiting examples:

Example 1. A hoist and deployable equipment system for a carrier, wherein the carrier is to carry a load suspended by a cable from the carrier, and wherein the hoist and deployable equipment system comprises: a hoist to be mounted the carrier, a dock for the deployable equipment, wherein the hoist comprises a reel for the cable and at least one of a cable length encoder or a reel force encoder, wherein the dock comprises an interface for a deployable equipment, and the deployable equipment, wherein the deployable equipment comprises a computer processor and memory, wherein the memory comprises a deployable equipment module which, when executed by the computer processor, obtains at least one of a cable length from the cable length encoder or a force on the reel from the reel force encoder and controls at least one of the deployable equipment, the reel, or the dock based at least partially thereon.

Example 2. The hoist and deployable equipment system according to Example 1, wherein the deployable equipment comprises a suspended load control apparatus, wherein the suspended load control apparatus comprises a thruster and a sensor suite, wherein the deployable equipment module is a load control module which, when executed by the computer processor, estimates or predicts a state or parameter of the suspended load control apparatus based on at least one of a sensor data from the sensor suite, the cable length or the force on the reel.

Example 3. The hoist and deployable equipment system according to Example 2, wherein the state of the suspended load control apparatus comprises at least one of a position, orientation, or motion and wherein the parameter of the suspended load control apparatus comprises at least one of a length of cable or a distance below the carrier, a mass or force on the reel, and a moment of inertia of the suspended load control apparatus.

Example 4. The hoist and deployable equipment system according to Example 3, wherein position comprises at least one of a coordinate in an x-axis, a y-axis, and a z-axis, wherein orientation comprises an orientation relative to a normal orientation of the suspended load control apparatus, and wherein motion comprises at least one of rotation, pendular motion, or movement from a first position to a second position.

Example 5. The hoist and deployable equipment system according to Example 2, wherein the load control module is to control at least one of the thruster or the reel to influence a near-term future state or parameter of the suspended load control apparatus.

Example 6. The hoist and deployable equipment system according to Example 2, wherein the estimated state or parameter comprises an elevation or z-axis coordinate of the suspended load control apparatus and wherein the load control module is to control the reel to influence a near-term future state or parameter of the suspended load control apparatus, wherein the near-term future state or parameter comprises an elevation or z-axis coordinate of the suspended load control apparatus.

Example 7. The hoist and deployable equipment system according to Example 6, wherein the load control module is to control the reel to influence the near-term future state or parameter of the suspended load control apparatus to one of maintain the load control apparatus at an elevation or to change the elevation of the load control apparatus.

Example 8. The hoist and deployable equipment system according to Example 7, wherein to change the elevation of the load control apparatus comprises to pick up or drop off the load control apparatus at a location.

Example 9. The hoist and deployable equipment system according to Example 6, wherein the carrier comprises one of a helicopter, a crane, or a fixed-wing aircraft and wherein to control the reel to influence the near-term future state or parameter of the suspended load control apparatus comprises to reel in or pay out cable from the reel.

Example 10. The hoist and deployable equipment system according to Example 2, wherein the load control module is to estimate or predict the state or parameter by combining at least one of the sensor data from the sensor suite, the cable length, or the force on the reel through a non-linear filter and is to determine a deviation between a previously predicted state or parameter and a currently measured state or parameter.

Example 11. The hoist and deployable equipment system according to Example 10, wherein the load control module is to further to predict the near-term future state or parameter based on the currently measured state or parameter with feedback from at least one of a functional mode or command state of an operational module, a thrust and orientation mapping, or a fan mapping.

Example 12. The hoist and deployable equipment system according to Example 10, wherein the functional mode or command state comprises at least one of idle, maintain relative location or position relative to a carrier, maintain relative location or position relative to a target location, maintain relative location or position relative to a location on the ground, move to a location, move between a first location and a second location, hold position, obstacle avoidance, or direct control.

Example 13. The hoist and deployable equipment system according to Example 1, wherein the interface for the deployable equipment comprises at least one of a communication interface, an electrical interface, or a docking interface.

Example 14. The hoist and deployable equipment system according to Example 13, wherein the communication interface is to provide a signal communication to the deployable equipment, wherein the electrical interface is to provide an electrical power to the deployable equipment, and wherein the docking interface is to secure the deployable equipment to the dock.

Example 15. The hoist and deployable equipment system according to Example 1, wherein the cable comprises a terminal equipment and wherein the terminal equipment comprises a deployable equipment seat, wherein the deployable equipment seat is to secure the deployable equipment to a top of the terminal equipment.

Example 16. The hoist and deployable equipment system according to Example 15, wherein the terminal equipment comprise at least one of cable hook or a bumper.

Example 17. The hoist and deployable equipment system according to Example 1, wherein the deployable equipment comprises at least one of a cable retainer or a coupling to a terminal equipment of the cable.

Example 18. The hoist and deployable equipment system according to Example 17, wherein the cable retainer is to secure the deployable equipment to or around the cable and wherein the coupling to the terminal equipment of the cable is to secure the deployable equipment to the terminal equipment of the cable.

Example 19. The hoist and deployable equipment system according to Example 17, wherein the coupling to the terminal equipment of the cable comprises at least one of a releasable clasp or a rotary bearing, wherein the rotary bearing is to allow a rotation of the deployable equipment to occur without transfer of a rotational force from the deployable equipment to the cable.

Example 20. The hoist and deployable equipment system according to Example 17, wherein the cable retainer comprises a cable channel and a cable channel closure and wherein the deployable equipment module is to engage or disengage the cable channel closure.

Example 21. The hoist and deployable equipment system according to Example 1, wherein to control the dock comprises to engage or disengage the dock to or from the deployable equipment.

Example 22. A computer implemented method to carry a deployable equipment suspended by a cable from a hoist of a carrier comprising: with a processor and memory of the deployable equipment, obtaining at least one of a cable length or a force on the hoist from the deployable equipment and controlling at least one of the deployable equipment, the load, the hoist, or a dock of the hoist based at least in part on the at least one of the cable length or the force on the hoist.

Example 23. The method according to Example 22, wherein the hoist comprises a reel for the cable and at least one of a cable length encoder or a reel force encoder, wherein the force on the hoist is measured by the reel force encoder, and further comprising determining the cable length from the cable length encoder and determining or obtaining at least one of a mass of the load and a mass of the deployable equipment from the reel force encoder.

Example 24. The method according to Example 22, wherein deployable equipment comprises a suspended load control apparatus, wherein the suspended load control apparatus comprises at least one of a thruster and a sensor suite, and further comprising, with the processor and memory of the deployable equipment, estimating or predicting a state or parameter of the deployable equipment based on at least one of a sensor data from the sensor suite, the cable length, or the force on the hoist.

Example 25. The method according to Example 24, wherein estimating or predicting the state or parameter comprises combining at least one of the sensor data from the sensor suite, the cable length, or the force on the hoist through a non-linear filter and determining a deviation between a previously predicted state or parameter and a currently measured state or parameter.

Example 26. The method according to Example 24, further comprising controlling at least one of the thruster and the reel according to the estimated or predicted state or parameter to influence a near-term future state or parameter of the deployable equipment.

Example 27. The method according to Example 26, further comprising predicting the near-term future state or parameter based on the currently measured state or parameter with feedback from at least one of a functional mode or command state of an operational module, a thrust and orientation mapping, or a fan mapping.

Example 28. The method according to Example 27, wherein the functional mode or command state comprises at least one of idling, maintaining relative location or position relative to a carrier, maintaining relative location or position relative to a target location, maintaining relative location or position relative to a location on the ground, moving to a location, moving between a first location and a second location, holding position, avoiding an obstacle, or direct control.

Example 29. The method according to Example 27, wherein the state or parameter comprises an elevation or z-axis coordinate and further comprising controlling the reel to influence the near-term future state or parameter of the suspended load control apparatus, wherein the near-term future state or parameter comprises an elevation or z-axis coordinate of the suspended load control apparatus.

Example 30. The method according to Example 27, wherein controlling the reel to influence the near-term future state or parameter of the suspended load control apparatus comprises paying out or reeling in the cable from the reel and wherein the function mode or command state comprises maintaining the load control apparatus at an elevation or changing the elevation of the load control apparatus.

Example 31. The method according to Example 22, wherein the hoist comprises a dock for the deployable equipment.

Example 32. The method according to Example 31, wherein the dock comprises at least one of a communication interface for the deployable equipment, an electrical interface for the deployable equipment, and a docking interface for the deployable equipment and further comprising, through the communication interface, providing a signal communication to the deployable equipment, though the electrical interface for the deployable equipment, providing an electrical power to the deployable equipment, and with the docking interface, securing the deployable equipment to the dock.

Example 33. The method according to Example 22, wherein the cable comprises a terminal equipment and wherein the terminal equipment comprises a deployable equipment seat, and further comprising securing the deployable equipment to a top of the terminal equipment on the deployable equipment seat.

Example 34. The method according to Example 33, wherein the terminal equipment comprises at least one of cable hook or a bumper.

Example 35. The method according to Example 22, wherein the deployable equipment comprises at least one of a cable retainer or a coupling to a terminal equipment of the cable and further comprising securing the deployable equipment to or around the cable with the cable retainer or securing the deployable equipment to the terminal equipment of the cable with the coupling to the terminal equipment of the cable.

Example 36. The method according to Example 35, wherein the coupling to the terminal equipment of the cable comprises at least one of a releasable clasp or a rotary bearing, and further comprising controlling an orientation of the deployable equipment without transfer of a rotational force from the deployable equipment to the cable due to the rotary bearing.

Example 37. The method according to Example 35, wherein the cable retainer comprises a cable channel and a cable channel closure and further comprising engaging or disengaging the cable channel closure.

Example 38. The method according to Example 22, wherein controlling the dock comprises engaging or disengaging the dock to or from the deployable equipment.

Example 39. A hoist and deployable equipment apparatus for a carrier, wherein the carrier is to carry a deployable equipment suspended by a cable from the carrier, the hoist and deployable equipment apparatus comprising: means for a hoist to be mounted to the carrier, wherein the hoist comprises a reel for the cable and at least one of means to determine a cable length or means to determine a force on the reel, means for a dock for the deployable equipment, wherein the means for the dock comprises means for an interface to a deployable equipment, and the deployable equipment, wherein the deployable equipment comprises means to obtain at least one of the cable length or the force on the reel and means to control at least one of the deployable equipment, the reel, or the dock based at least partially on the cable length or the force on the reel.

Example 40. The hoist and deployable equipment apparatus for the carrier according to Example 39, wherein the deployable equipment further comprises means to control the deployable equipment, wherein the means to control the deployable equipment comprises means for at least one of a thruster and a sensor suite, and further comprising means to estimate or predict a state or parameter of the deployable equipment based on at least one of a sensor data from the sensor suite, the cable length or the force on the reel.

Example 41. The hoist and deployable equipment apparatus for the carrier according to Example 40, wherein the state comprises at least one of a position, orientation, or motion.

Example 42. The hoist and deployable equipment apparatus for the carrier according to Example 40, further comprising means to control at least one of the thruster or the reel according to the predicted or estimated state or parameter to influence a near-term future state or parameter of the deployable equipment.

Example 43. The hoist and deployable equipment apparatus for the carrier according to Example 40, further comprising means to estimate or predict the state or parameter by combining at least one of a sensor data from the sensor suite, the cable length, or the force on the reel through a non-linear filter and means to determine a deviation between a previously predicted state or parameter and a currently measured state or parameter.

Example 44. The hoist and deployable equipment apparatus for the carrier according to Example 43, further comprising means to predict the near-term future state or parameter based on the currently measured state or parameter with feedback from at least one of a functional mode or command state of an operational module, a thrust and orientation mapping, or a fan mapping.

Example 45. The hoist and deployable equipment apparatus for the carrier according to Example 44, wherein the functional mode or command state comprises at least one of idle, maintain relative location or position relative to a carrier, maintain relative location or position relative to a target location, maintain relative location or position relative to a location on the ground, move to a location, move between a first location and a second location, hold position, obstacle avoidance, or direct control.

Example 46. The hoist and deployable equipment apparatus for the carrier according to Example 39, wherein the means for the interface to the deployable equipment comprises at least one of means to provide a signal communication to the deployable equipment, means to provide an electrical power to the deployable equipment, and means to provide an electrical power to the deployable equipment, and means to secure the deployable equipment to the dock.

Example 47. The hoist and deployable equipment apparatus for the carrier according to Example 39, wherein the cable comprises means for a terminal equipment and wherein the terminal equipment comprises means to secure the deployable equipment to a top of the terminal equipment.

Example 48. The hoist and deployable equipment apparatus for the carrier according to Example 47, wherein the means for the terminal equipment comprise at least one of means for a cable hook or means for a bumper.

Example 49. The hoist and deployable equipment apparatus for the carrier according to Example 39, wherein the deployable equipment comprises at least one of means for a cable retainer or means for a coupling to a terminal equipment of the cable.

Example 50. The hoist and deployable equipment apparatus for the carrier according to Example 49, wherein the means for the cable retainer comprises means to secure the deployable equipment to or around the cable and wherein means for the coupling to the terminal equipment of the cable comprises means to secure the deployable equipment to the terminal equipment of the cable.

Example 51. The hoist and deployable equipment apparatus for the carrier according to Example 49, wherein the means for the coupling to the terminal equipment of the cable comprises at least one of means for a releasable clasp or means to allow a rotation of the deployable equipment without transfer of a rotational force from the deployable equipment to the cable.

Example 52. The hoist and deployable equipment apparatus for the carrier according to Example 49, wherein the means for the cable retainer comprises means for a cable channel and means for a cable channel closure and means to engage or disengage the cable channel closure.

Example 53. The hoist and deployable equipment apparatus for the carrier according to Example 39, wherein means to control the dock comprises to means to engage or disengage the dock to or from the deployable equipment.

Example 54. One or more computer-readable media comprising instructions that cause a computer device, in response to execution of the instructions by a processor of the computer device, to: obtain at least one of a cable length of a cable between a hoist of a carrier and a deployable equipment on the cable or a force on the hoist from the deployable equipment and control at least one of the deployable equipment, a reel of the hoist, or a dock of the hoist based at least in part on the at least one of the cable length or the force on the hoist.

Example 55. The computer-readable media according to Example 54, wherein the instructions further cause the computer device to estimate or predict a state or parameter of the deployable equipment by combining at least one of a sensor data from a sensor suite, the cable length, or the force on the reel through a non-linear filter and determine a deviation between a previously predicted state or parameter and a currently measured state or parameter.

Example 56. The computer-readable media according to Example 55, wherein the instructions further cause the computer device to control at least one of a thruster or the reel according to the estimated or predicted state or parameter to influence a near-term future state or parameter of the suspended load control apparatus.

Example 57. The computer-readable media according to Example 55, wherein the instructions further cause the computer device to predict the near-term future state or parameter based on the currently measured state or parameter with feedback from at least one of a functional mode or command state of an operational module, a thrust and orientation mapping, or a fan mapping.

Example 58. The computer-readable media according to Example 57, wherein the functional mode or command state comprises at least one of idle, maintain relative location or position relative to a carrier, maintain relative location or position relative to a target location, maintain relative location or position relative to a location on the ground, move to a location, move between a first location and a second location, hold position, obstacle avoidance, or direct control.

Example 59. The computer-readable media according to Example 57, wherein the functional mode or command state causes the instructions to cause the computer device to maintain the deployable equipment at an elevation or to change the elevation of the deployable equipment by paying out or reeling in the cable from the reel.

Example 60. The computer-readable media according to Example 54, wherein the instructions further cause the computer device to at least one of provide a signal communication to the deployable equipment, provide an electrical power to the deployable equipment, and secure the deployable equipment to a dock for the deployable equipment.

Example 61. The computer-readable media according to Example 54, wherein the instructions further cause the computer device to secure the deployable equipment to a top of a terminal equipment on a deployable equipment seat, wherein the cable comprises the terminal equipment and wherein the terminal equipment comprises the deployable equipment seat.

Example 62. The computer-readable media according to Example 61, wherein the terminal equipment comprises at least one of cable hook or a bumper.

Example 63. The computer-readable media according to Example 54, wherein the instructions further cause the computer device to at least one of secure the deployable equipment to or around the cable with a cable retainer or secure the deployable equipment to the terminal equipment of the cable with a coupling to the terminal equipment of the cable.

Example 64. The computer-readable media according to Example 63, wherein the instructions further cause the computer device to control an orientation of the deployable equipment without transfer of a rotational force from the deployable equipment to the cable due to a rotary bearing.

Example 65. The computer-readable media according to Example 63, wherein the instructions further cause the computer device to engage or disengage a cable channel closure of a cable channel.

Example 66. The computer-readable media according to Example 54, wherein the instructions further cause the computer device to engage or disengage the dock to or from the deployable equipment.

The invention claimed is:

1. A hoist and deployable equipment system for a carrier, wherein the carrier is to carry a load suspended by a cable from the carrier, and wherein the hoist and deployable equipment system comprises:
a hoist to be mounted to the carrier, wherein the hoist comprises a reel for the cable and at least one of a cable length encoder or a reel force encoder,
a dock for the deployable equipment, wherein the dock comprises an interface for a deployable equipment, and
the deployable equipment, wherein the deployable equipment is to be secured on the cable below the hoist and wherein the deployable equipment comprises a computer processor and memory, wherein the memory comprises a deployable equipment module which, when executed by the computer processor, obtains at least one of a cable length from the cable length encoder or a force on the reel from the reel force encoder and controls at least one of the deployable equipment, the reel, or the dock based at least partially thereon and wherein the deployable equipment comprises a suspended load control apparatus, wherein the suspended load control apparatus comprises a thruster and a sensor suite, wherein the deployable equipment module is a load control module which, when executed by the computer processor, estimates or predicts a state or parameter of the suspended load control apparatus based on at least one of a sensor data from the sensor suite, the cable length or the force on the reel.

2. The hoist and deployable equipment system according to claim 1, wherein the load control module is to control at least one of the thruster or the reel to influence a near-term future state or parameter of the suspended load control apparatus.

3. The hoist and deployable equipment system according to claim 2, wherein to control the reel to influence the near-term future state or parameter of the suspended load control apparatus comprises to reel in or pay out cable from the reel.

4. The hoist and deployable equipment system according to claim 1, wherein the interface for the deployable equipment comprises at least one of a communication interface, an electrical interface, or a docking interface, wherein the communication interface is to provide a signal communication to the deployable equipment, wherein the electrical interface is to provide an electrical power to the deployable equipment, and wherein the docking interface is to secure the deployable equipment to the dock.

5. A hoist and deployable equipment system for a carrier, wherein the carrier is to carry a load suspended by a cable from the carrier, and wherein the hoist and deployable equipment system comprises:
  a hoist to be mounted to the carrier, wherein the hoist comprises a reel for the cable and at least one of a cable length encoder or a reel force encoder,
  a dock for the deployable equipment, wherein the dock comprises an interface for a deployable equipment, and
  the deployable equipment, wherein the deployable equipment is to be secured on the cable below the hoist and wherein the deployable equipment comprises a computer processor and memory, wherein the memory comprises a deployable equipment module which, when executed by the computer processor, obtains at least one of a cable length from the cable length encoder or a force on the reel from the reel force encoder and controls at least one of the deployable equipment, the reel, or the dock based at least partially thereon and, wherein the deployable equipment comprises at least one of a cable retainer or a coupling to a terminal equipment of the cable wherein the cable retainer is to secure the deployable equipment to or around the cable and wherein the coupling to the terminal equipment of the cable is to secure the deployable equipment to the terminal equipment of the cable, and wherein the coupling to the terminal equipment of the cable comprises at least one of a releasable clasp or a rotary bearing, wherein the rotary bearing is to allow a rotation of the deployable equipment to occur without transfer of a rotational force from the deployable equipment to the cable.

6. A hoist and deployable equipment system for a carrier, wherein the carrier is to carry a load suspended by a cable from the carrier, and wherein the hoist and deployable equipment system comprises:
  a hoist to be mounted to the carrier, wherein the hoist comprises a reel for the cable and at least one of a cable length encoder or a reel force encoder,
  a dock for the deployable equipment, wherein the dock comprises an interface for a deployable equipment, and
  the deployable equipment, wherein the deployable equipment is to be secured on the cable below the hoist and wherein the deployable equipment comprises a computer processor and memory, wherein the memory comprises a deployable equipment module which, when executed by the computer processor, obtains at least one of a cable length from the cable length encoder or a force on the reel from the reel force encoder and controls at least one of the deployable equipment, the reel, or the dock based at least partially thereon and, wherein to control the dock comprises to engage or disengage the dock to or from the deployable equipment.

7. A computer implemented method to carry a deployable equipment suspended by a cable from a hoist of a carrier comprising: with a processor and memory of the deployable equipment, obtaining at least one of a cable length from a cable length encoder of the hoist or a force on the hoist from a reel force encoder of the hoist and controlling at least one of the deployable equipment, the load, the hoist, or a dock of the hoist based at least in part on the at least one of the cable length or the force on the hoist, wherein deployable equipment is secured on the cable below the hoist and wherein the deployable equipment comprises at least one of a thruster and a sensor suite, and further comprising, with the processor and memory of the deployable equipment, estimating or predicting a state or parameter of the deployable equipment based on at least one of a sensor data from the sensor suite, the cable length, or the force on the hoist, wherein estimating or predicting the state or parameter comprises combining at least one of the sensor data from the sensor suite, the cable length, or the force on the hoist through a non-linear filter and determining a deviation between a previously predicted state or parameter and a currently measured state or parameter.

8. The method according to claim 7, further comprising controlling at least one of the thruster and the reel according to the estimated or predicted state or parameter to influence a near-term future state or parameter of the deployable equipment, and further comprising predicting the near-term future state or parameter based on the currently measured state or parameter with feedback from at least one of a functional mode or command state of an operational module, a thrust and orientation mapping, or a fan mapping.

9. The method according to claim 8, wherein controlling the reel to influence the near-term future state or parameter of the suspended load control apparatus comprises paying out or reeling in the cable from the reel and wherein the function mode or command state comprises maintaining the load control apparatus at an elevation or changing the elevation of the load control apparatus.

10. The method according to claim 7, wherein the hoist comprises a dock for the deployable equipment, wherein the dock comprises at least one of a communication interface for the deployable equipment, an electrical interface for the deployable equipment, and a docking interface for the deployable equipment and further comprising, through the communication interface, providing a signal communication to the deployable equipment, though the electrical interface for the deployable equipment, providing an electrical power to the deployable equipment, and with the docking interface, securing the deployable equipment to the dock.

11. A computer implemented method to carry a deployable equipment suspended by a cable from a hoist of a carrier comprising: with a processor and memory of the deployable equipment, obtaining at least one of a cable length from a cable length encoder of the hoist or a force on the hoist from a reel force encoder of the hoist and controlling at least one of the deployable equipment, the load, the hoist, or a dock of the hoist based at least in part on the at least one of the cable length or the force on the hoist, wherein deployable equipment is secured on the cable below the hoist and, wherein the deployable equipment comprises at least one of a cable retainer or a coupling to a terminal equipment of the cable and further comprising securing the deployable equipment to or around the cable with the cable retainer or securing the deployable equipment to the terminal equipment of the cable with the coupling to the terminal equipment of the cable, wherein the coupling to the terminal equipment of the cable comprises at least one of a releasable clasp or a rotary bearing, and further comprising controlling an orientation of the deployable equipment without transfer of a rotational force from the deployable equipment to the cable due to the rotary bearing.

12. A computer implemented method to carry a deployable equipment suspended by a cable from a hoist of a carrier comprising: with a processor and memory of the deployable equipment, obtaining at least one of a cable length from a cable length encoder of the hoist or a force on the hoist from a reel force encoder of the hoist and controlling at least one of the deployable equipment, the load, the hoist, or a dock of the hoist based at least in part on the at least one of the cable length or the force on the hoist, wherein deployable equipment is secured on the cable below the hoist and, wherein controlling the dock comprises engaging or disengaging the dock to or from the deployable equipment.

13. A hoist and deployable equipment apparatus for a carrier, wherein the carrier is to carry a deployable equipment suspended by a cable from the carrier, the hoist and deployable equipment apparatus comprising:
   means for a hoist to be mounted to the carrier, wherein the hoist comprises a reel for the cable and at least one of means to determine a cable length or means to determine a force on the reel,
   means for a dock for the deployable equipment, wherein the means for the dock comprises means for an interface to a deployable equipment, and
   the deployable equipment, wherein the deployable equipment is secured on the cable below the hoist and wherein the deployable equipment comprises means to obtain at least one of the cable length or the force on the reel and means to control at least one of the deployable equipment, the reel, or the dock based at least partially on the cable length or the force on the reel, wherein the deployable equipment further comprises means to control the deployable equipment, wherein the means to control the deployable equipment comprises means for at least one of a thruster and a sensor suite, and further comprising means to estimate or predict a state or parameter of the deployable equipment based on at least one of a sensor data from the sensor suite, the cable length or the force on the reel.

14. The hoist and deployable equipment apparatus for the carrier according to claim 13, further comprising means to control at least one of the thruster or the reel according to the predicted or estimated state or parameter to influence a near-term future state or parameter of the deployable equipment.

15. The hoist and deployable equipment apparatus for the carrier according to claim 13, further comprising means to estimate or predict the state or parameter by combining at least one of a sensor data from the sensor suite, the cable length, or the force on the reel through a non-linear filter and means to determine a deviation between a previously predicted state or parameter and a currently measured state or parameter, further comprising means to predict the near-term future state or parameter based on the currently measured state or parameter with feedback from at least one of a functional mode or command state of an operational module, a thrust and orientation mapping, or a fan mapping.

16. A hoist and deployable equipment apparatus for a carrier, wherein the carrier is to carry a deployable equipment suspended by a cable from the carrier, the hoist and deployable equipment apparatus comprising:
   means for a hoist to be mounted to the carrier, wherein the hoist comprises a reel for the cable and at least one of means to determine a cable length or means to determine a force on the reel,
   means for a dock for the deployable equipment, wherein the means for the dock comprises means for an interface to a deployable equipment, and
   the deployable equipment, wherein the deployable equipment is secured on the cable below the hoist and comprises means to obtain at least one of the cable length or the force on the reel and wherein the deployable equipment comprises means to control at least one of the deployable equipment, the reel, or the dock based at least partially on the cable length or the force on the reel, wherein means to control the dock comprises to means to engage or disengage the dock to or from the deployable equipment.

* * * * *